US012756890B2

(12) United States Patent
Li et al.

(10) Patent No.: US 12,756,890 B2
(45) Date of Patent: Oct. 6, 2026

(54) DISPLAY APPARATUS AND METHOD

(71) Applicant: VIDAA (NETHERLANDS) INTERNATIONAL HOLDINGS B.V., Duiven (NL)

(72) Inventors: Cheng Li, Duiven (NL); Yunying Hao, Duiven (NL); Futeng Niu, Duiven (NL); Xiaoxia Sun, Duiven (NL)

(73) Assignee: VIDAA (NETHERLANDS) INTERNATIONAL HOLDINGS B.V., Duiven (NL)

( * ) Notice: Subject to any disclaimer, the term of this patent is extended or adjusted under 35 U.S.C. 154(b) by 106 days.

(21) Appl. No.: 18/667,604

(22) Filed: May 17, 2024

(65) Prior Publication Data

US 2024/0305856 A1 Sep. 12, 2024

Related U.S. Application Data

(63) Continuation of application No. PCT/EP2023/064809, filed on Jun. 2, 2023.

(30) Foreign Application Priority Data

Jun. 6, 2022 (CN) ......................... 202210634320.7
Sep. 2, 2022 (CN) ......................... 202211069427.8

(51) Int. Cl.
*H04N 21/431* (2011.01)
*H04H 60/72* (2008.01)
(Continued)

(52) U.S. Cl.
CPC ........ *H04N 21/4316* (2013.01); *H04H 60/72* (2013.01); *H04N 21/26283* (2013.01);
(Continued)

(58) Field of Classification Search
CPC ................ H04N 21/436; H04N 60/72; H04N 21/26283; H04N 21/4622; H04N 21/4755;
(Continued)

(56) References Cited

U.S. PATENT DOCUMENTS 6,172,677 B1 * 1/2001 Stautner ............. H04N 21/4821 725/39
6,388,714 B1 * 5/2002 Schein ............... H04N 21/2543 348/E7.024
(Continued)

FOREIGN PATENT DOCUMENTS

CN 101630987 A 1/2010
CN 105472428 A 4/2016
(Continued)

OTHER PUBLICATIONS

The World Intellectual Property Organization (WIPO) International Search Report for PCT/CN2023/064809 Aug. 25, 2023 3 Pages.
(Continued)

*Primary Examiner* — Kyu Chae
(74) *Attorney, Agent, or Firm* — ANOVA LAW GROUP, PLLC

(57) ABSTRACT

Disclosed are a display apparatus and method. The method includes: in response to a command for displaying an electronic program guide from a user, obtaining a set of target channels, a target time period and one or more programs in the set of target channels within the target time period, where the set of target channels includes all channels presented in a target presentation page; and controlling a display to display the electronic program guide including the target presentation page on a user interface. The target presentation page includes areas for channel presentation and areas for program presentation. The area for channel presentation is used for presenting a channel name, the area
(Continued)

for program presentation is used for presenting program names of the programs, and the first area for presentation of the first program is configured with a visual tag for indicating a program type of the first program.

13 Claims, 21 Drawing Sheets

(51) Int. Cl.
*H04N 21/262* (2011.01)
*H04N 21/462* (2011.01)
*H04N 21/475* (2011.01)
*H04N 21/482* (2011.01)
*H04N 21/488* (2011.01)
*H04N 21/84* (2011.01)

(52) U.S. Cl.
CPC ..... *H04N 21/4622* (2013.01); *H04N 21/4755* (2013.01); *H04N 21/4821* (2013.01); *H04N 21/4884* (2013.01); *H04N 21/84* (2013.01)

(58) Field of Classification Search
CPC ........... H04N 21/4821; H04N 21/4884; H04N 21/84; H04N 21/435; H04N 21/478; H04N 21/4312
See application file for complete search history.

(56) References Cited

U.S. PATENT DOCUMENTS 6,756,997 B1 * 6/2004 Ward, III ........... H04N 21/4345 348/E7.071
8,281,339 B1 * 10/2012 Walker ............... H04N 21/4755 705/14.4
8,327,403 B1 * 12/2012 Chilvers .......... H04N 21/47214 725/86
9,038,103 B2 * 5/2015 Craner ................. H04N 21/482 725/38
10,448,107 B2 * 10/2019 Kim ................... H04N 21/4722
10,951,926 B2 * 3/2021 Ellis ................... H04N 7/17318
12,120,394 B2 * 10/2024 Hamano .......... H04N 21/64322
2001/0030661 A1 * 10/2001 Reichardt .......... H04N 21/4312 715/721
2005/0028208 A1 * 2/2005 Ellis ................... H04N 21/4755 348/E7.071
2006/0143655 A1 * 6/2006 Ellis ................... H04N 21/4312 725/38
2008/0155607 A1 * 6/2008 Klappert .............. H04N 21/435 725/62
2009/0133069 A1 * 5/2009 Conness ............ H04N 21/4532 725/46
2010/0131983 A1 * 5/2010 Shannon ............ H04N 21/4524 725/46
2010/0153885 A1 * 6/2010 Yates .................. G06F 16/7867 707/723
2010/0192181 A1 * 7/2010 Friedman ........... H04N 21/4355 725/44
2010/0262995 A1 * 10/2010 Woods .................... G06T 15/20 725/40
2011/0069940 A1 * 3/2011 Shimy .............. H04N 21/42201 386/296
2011/0078731 A1 * 3/2011 Nishimura .............. G06F 9/453 725/39
2011/0154403 A1 * 6/2011 Sinha ..................... H04N 21/47 725/52
2011/0163939 A1 * 7/2011 Tam ...................... G06F 3/1454 345/2.3
2011/0279359 A1 * 11/2011 McCarty .......... H04N 21/42203 345/156
2011/0283232 A1 * 11/2011 Jordan ................... H04N 21/47 715/810
2011/0283325 A1 * 11/2011 Tomita ................... H04N 21/47 725/61
2011/0286719 A1 * 11/2011 Woods ............... H04N 21/4583 386/293
2012/0311635 A1 * 12/2012 Mushkatblat ........ H04N 21/485 725/43
2013/0036439 A1 * 2/2013 Kim ................. H04N 21/26283 725/40
2013/0294755 A1 * 11/2013 Arme ..................... G11B 27/28 386/E5.041
2015/0020103 A1 * 1/2015 Reichardt .............. H04N 21/47 725/44
2018/0288490 A1 * 10/2018 Thomas ............. H04N 21/8133
2020/0128294 A1 * 4/2020 Gupta .............. H04N 21/44222
2021/0219019 A1 * 7/2021 Hamano .............. H04N 21/472
2022/0060777 A1 2/2022 Fraleu et al.
2022/0279230 A1 * 9/2022 Shao ................ H04N 21/42216
2023/0017913 A1 * 1/2023 Gupta ................ H04N 21/6587
2023/0065762 A1 * 3/2023 Gupta ................... G06F 16/489

FOREIGN PATENT DOCUMENTS

| | | | |
|---|---|---|---|
| CN | 108093304 | A | 5/2018 |
| CN | 108924620 | A | 11/2018 |
| CN | 112272331 | A | 1/2021 |
| CN | 112351328 | A | 2/2021 |
| CN | 112463269 | A | 3/2021 |
| CN | 112733050 | A | 4/2021 |
| CN | 112887753 | A | 6/2021 |
| CN | 113038160 | A | 6/2021 |
| CN | 113490025 | A | 10/2021 |
| WO | 2009022852 | A1 | 2/2009 |

OTHER PUBLICATIONS

China National Intellectual Property Administration (CNIPA) Office Action 1 for 202210634320.7, Aug. 4, 2023 16 Pages (including translation).

China National Intellectual Property Administration (CNIPA) Office Action 2 for 202210634320.7, Jan. 5, 2024 8 Pages (including translation).

China National Intellectual Property Administration (CNIPA) Office Action 3 for 202210634320.7, Mar. 21, 2024 17 Pages (including translation).

China National Intellectual Property Administration (CNIPA) Office Action 1 for 202211069427.8, Jun. 16, 2023 14 Pages (including translation).

China National Intellectual Property Administration (CNIPA) Office Action 2 for 202211069427.8, Sep. 4, 2023 12 Pages (including translation).

China National Intellectual Property Administration (CNIPA) Decision of Rejection for 202211069427.8, Nov. 1, 2023 15 Pages (including translation).

* cited by examiner

DISPLAY APPARATUS AND METHOD

CROSS-REFERENCE TO RELATED APPLICATIONS

The application is a continuation application of International Application No. PCT/EP2023/064809 filed on Jun. 2, 2023, which claims priority to the Chinese Patent Application No. 202210634320.7, filed on Jun. 6, 2022, and Chinese Patent Application No. 202211069427.8, filed on Sep. 2, 2022, all of which are incorporated herein in their entities by reference.

FIELD

The disclosure relates to the field of display technology, in particular to a display apparatus and a method.

BACKGROUND

A display apparatus functions as a terminal for outputting images, and is generally implemented as a smart TV, a mobile terminal, a smart commercial monitor, a projector, etc. The display apparatus may be a television product based on an Internet application technology, and having an open operating system and chip and an open application platform, and may be integrated with audio/video function, entertainment function, and data communication function, and can realize human-machine interaction and meet various demands from users.

An electronic program guide (EPG) is used for presenting program information of a plurality of channels within a specified time period, and the user can know a to-be-played program of each channel within the specified time period from the EPG. However, a large amount of program information is generally shown in the EPG, and it is difficult to find a specific program quickly and accurately, resulting in poor user experience.

SUMMARY

In an aspect, embodiments of the disclosure provide a display apparatus. The display apparatus includes a display configured to display an image from broadcast system or Internet, and/or, a user interface; a communicator, configured to communicate with the network; a remote control including a plurality of buttons; a memory, configured to store instructions and data associated with the display; and at least one processor, in connection with the display, the communicator and the memory. The at least one processor is configured to execute the instructions to cause the display apparatus to perform: in response to a command for displaying an electronic program guide from a user, obtaining a set of target channels, a target time period and one or more programs in the set of target channels within the target time period, where the set of target channels includes all channels presented in a target presentation page, and the target time period is a time period for presentation in the target presentation page; and controlling the display to display the electronic program guide including the target presentation page on a user interface, wherein the target presentation page includes a plurality of areas for channel presentation and a plurality of areas for program presentation, the area for channel presentation is used for presenting a channel name, the area for program presentation is used for presenting one or more program names of the one or more programs, a length of a first area for presentation of a first program is proportional to a program duration of the first program, the first area for presentation of the first program is configured with a visual tag for indicating a program type of the first program.

In another aspect, embodiments of the disclosure provide a method for a display apparatus. The method includes: in response to a command for displaying an electronic program guide from a user via a remote control of the display apparatus, obtaining a set of target channels, a target time period and one or more programs in the set of target channels within the target time period, where the set of target channels includes all channels presented in a target presentation page, and the target time period is a time period for presentation in the target presentation page; where the remote control includes a plurality of buttons; and controlling a display of the display apparatus to display the electronic program guide including the target presentation page on a user interface, where the display is configured to display an image from broadcast system or Internet, and/or the user interface; the target presentation page includes a plurality of areas for channel presentation and a plurality of areas for program presentation, the area for channel presentation is used for presenting a channel name, the area for program presentation is used for presenting one or more program names of the one or more programs, a length of a first area for presentation of a first program is proportional to a program duration of the first program, the first area for presentation of the first program is configured with a visual tag for indicating a program type of the first program.

DETAILED DESCRIPTION

Embodiments of the disclosure will be described clearly and completely below in combination with the accompanying drawings in embodiments of the disclosure. Unless otherwise indicated, when the following description refers to the accompanying drawings, the same numeral in the different accompanying drawings represents the same or similar elements. Embodiments described in the following description do not represent all embodiments that consistent with the disclosure. They are merely examples of an apparatus and a method consistent with some aspects of the disclosure.

It should be noted that the brief description of the terms in the disclosure is only for the convenience of understanding the embodiments described hereafter, and is not intended to limit the embodiments of the disclosure. Unless indicated otherwise, these terms should be understood according to the plain and ordinary meanings.

Figure 1:
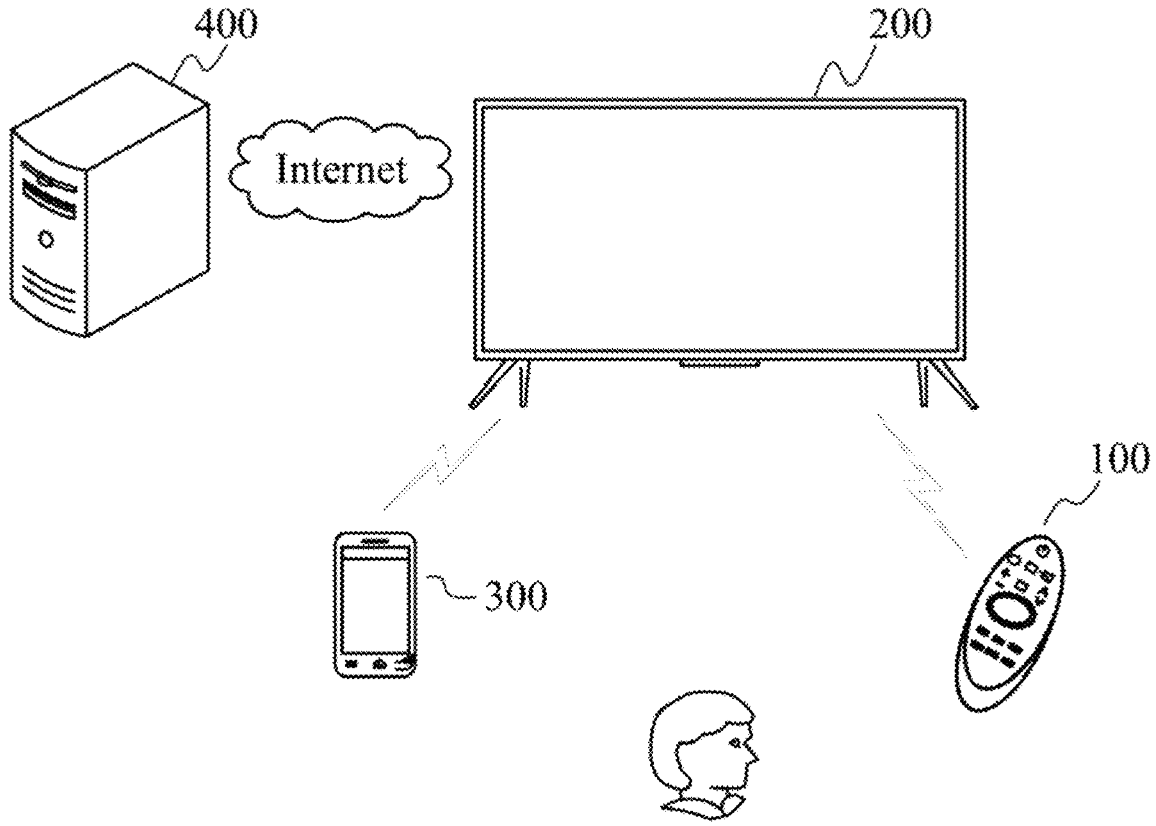
FIG. 1 shows a schematic diagram of an operation scenario between a display apparatus and a control device according to some embodiments.
Figure 2:
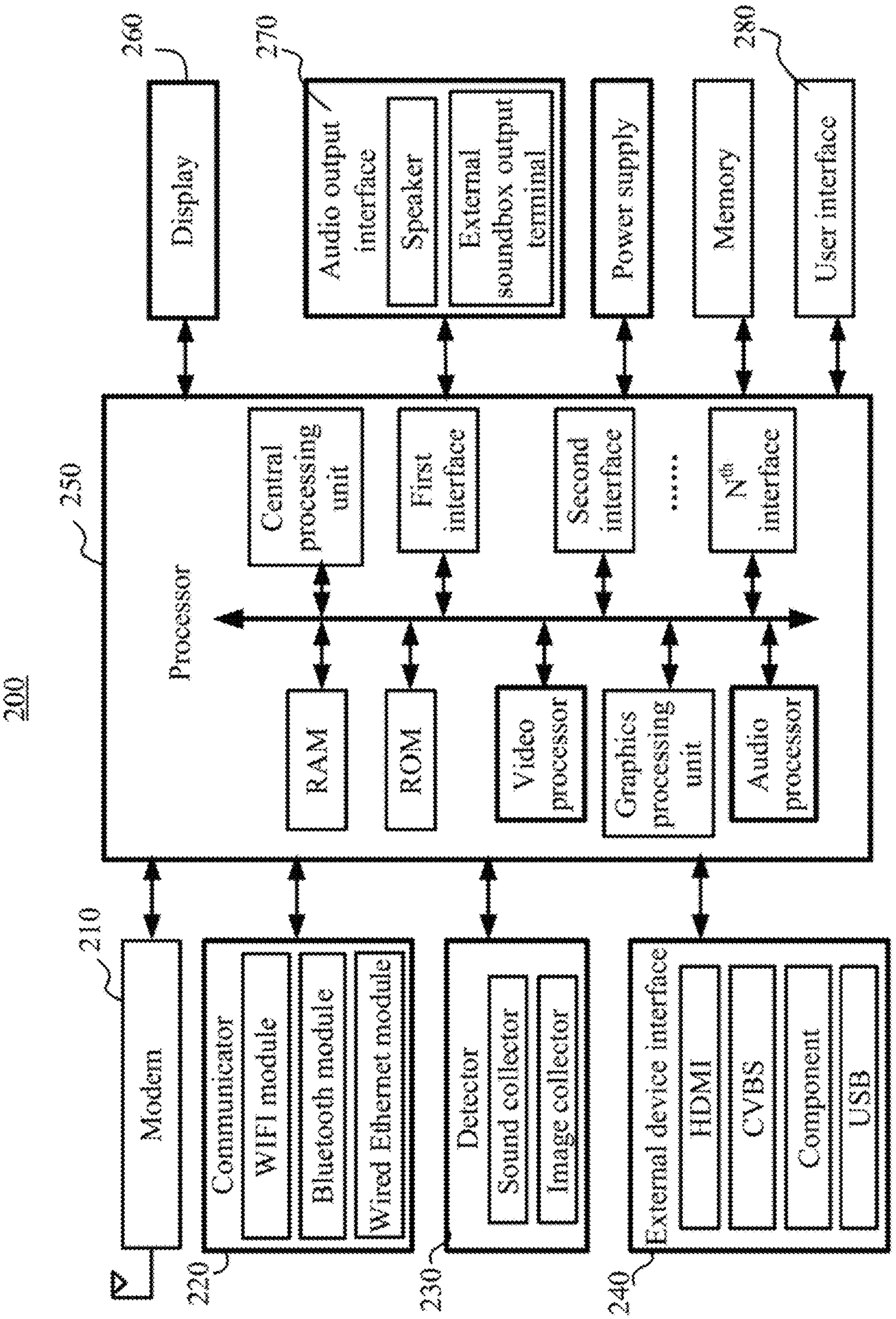
FIG. 2 shows a block diagram of a hardware configuration of the display apparatus according to some embodiments.

The display apparatus according to the disclosure may be, for example, a smart television, a laser projector, a monitor, an electronic bulletin board, an electronic table and the like, or may be a mobile phone, a tablet computer, a smart watch and other apparatuses with a display screen. FIG. 1 and FIG. 2 are specific embodiments of a display apparatus of the disclosure.

FIG. 1 shows a schematic diagram of an operation scenario between a display apparatus and a control device according to some embodiments. As shown in FIG. 1, a user may operate the display apparatus 200 through a smart terminal 300 or a control device 100.

Figure 3:
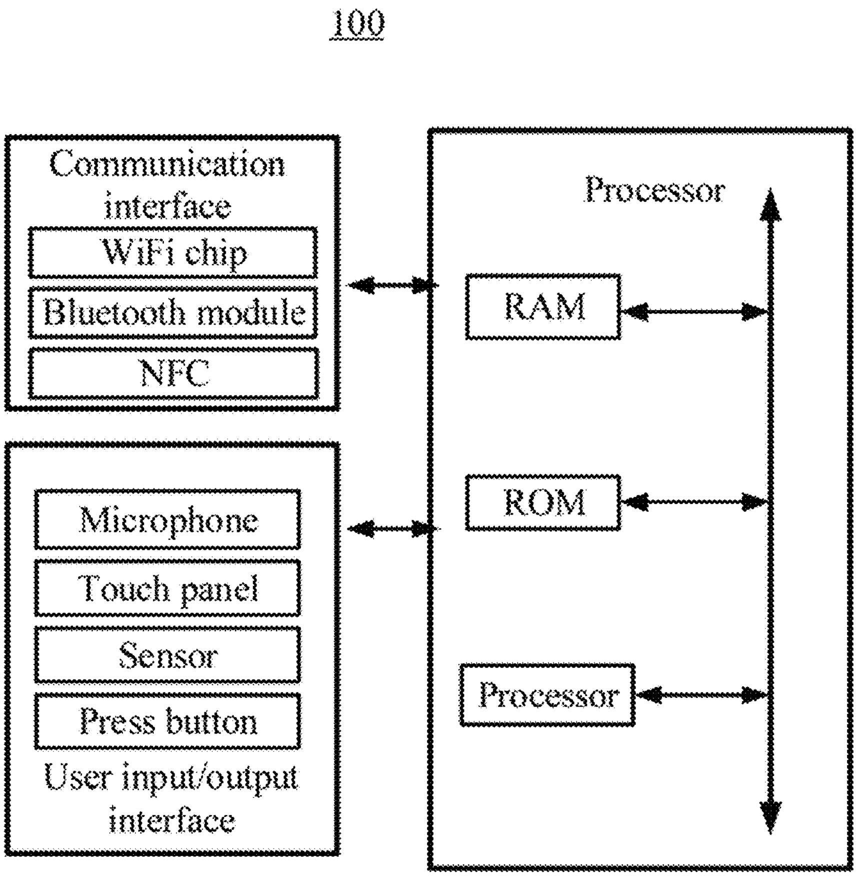
FIG. 3 shows a block diagram of a hardware configuration of the control device according to some embodiments.

FIG. 3 is a block diagram of a configuration of the control device 100. In some embodiments, the control device 100 may be a remote control, and can communicate with the display apparatus 200 according to infrared protocol, Bluetooth protocol, or other short-distance communication methods, to control the display apparatus 200 through wireless or other wired methods. A user can input user commands through keys, voice input and control panel on the remote control, to control the display apparatus 200.

In some embodiments, the smart terminal 300 (such as a mobile terminal, a tablet computer, a computer, a laptop computer, etc.) may be used to control the display apparatus 200 via, for example, an application running on the smart terminal.

In some embodiments, the display apparatus 200 also communicates data with the server 400. The display apparatus 200 may perform the communication and connection through a Local Area Network (LAN), a Wireless Local Area Network (WLAN), and other networks.

FIG. 3 shows a block diagram of a configuration of a display apparatus 200 according to some embodiments.

The display apparatus 200 includes at least one of a modem 210, a communicator 220, a detector 230, an interface 240 for external device, at least one processor 250, a display 260, an audio output interface 270, a memory, a power supply or a user input interface 280.

The modem 210 is configured to receive the broadcast television signals by a wired or wireless manner, and demodulates audio and video signals, such as EPG data signals, from a plurality of wireless or wired broadcast television signals. In some embodiments, the display apparatus 200 may establish the sending and receiving of control signals and data signals with the control device 100 or the server 400 through the communicator 220. In some embodiments, the at least one processor 250 and the modem 210 may be located in separate devices, that is, the modem 210 may be located in an external device (such as an external set-top box, etc.) of the main device where the at least one processor 250 is located. In some embodiments, the at least one processor 250 controls the operations of the display apparatus and responds to the user's operations through various software applications stored in the memory. The at least one processor 250 controls the overall operation of the display apparatus 200. For example, in response to a selection of a UI object displayed on the display 260. In some embodiments, the at least one processor 250 includes at least one of a Central Processing Unit (CPU), a video processor, an audio processor, a Graphics Processing Unit (GPU), an RAM (Random Access Memory), an ROM (Read-Only Memory), first to $n^{th}$ interfaces for input/output, a communication bus (Bus), etc. In some embodiments, the display 260 includes a panel component for displaying an image, a driving component for driving the image to display, a component for receiving an image signal output from the at least one processor 250 and displaying a video content, image content and a menu control interface, and a user interface. In some embodiments, the display 260 may be a liquid crystal display, an OLED display and a projection display, or may also be a projection device and a projection screen. The user may input a user command on the Graphical User Interface (GUI) displayed on the display 260, and the user input interface receives the user input command through the Graphical User Interface (GUI). Alternatively, the user may input a user command by inputting a particular sound or gesture, and the user input interface recognizes the sound or gesture through the sensor to receive the user input command.

Figure 4:
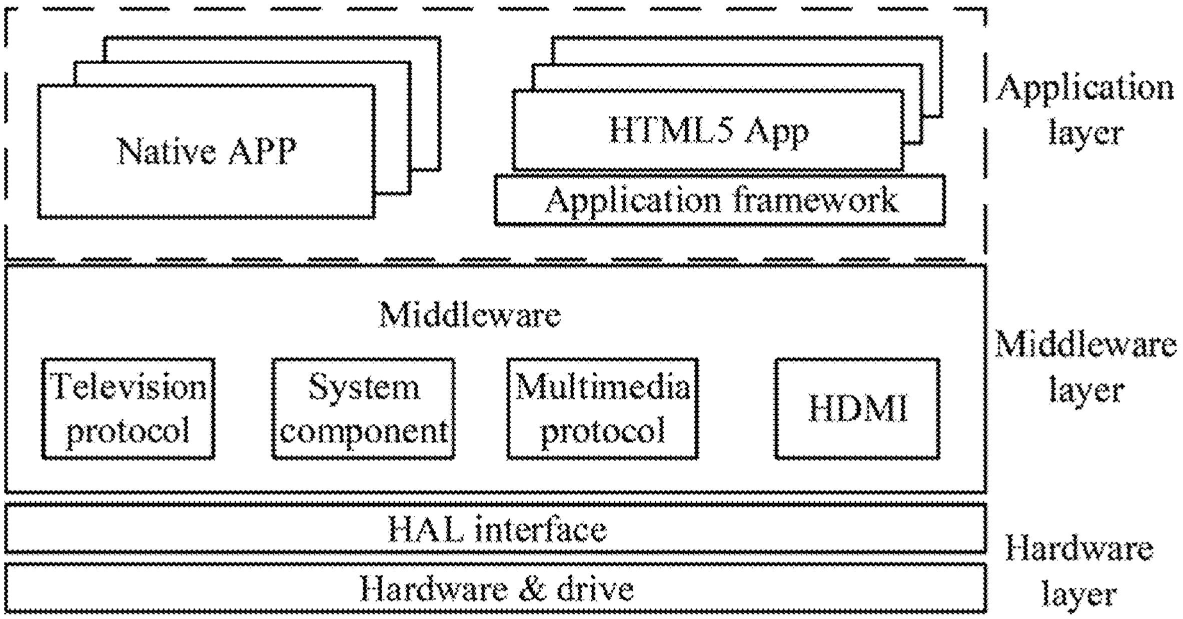
FIG. 4 shows a diagram of a configuration of an operating system of the display apparatus according to some embodiments.

In some embodiments, the display apparatus 200 is based on VIDAA software platform. As shown in FIG. 4, the operating system includes three layers, which are an application layer, a middleware layer and a hardware layer respectively from top to bottom. The application layer mainly includes common applications on a television, and an application framework. The common applications are mainly applications developed based on a browser, for example, HTML5 APPs, and Native APPs.

Figure 5:
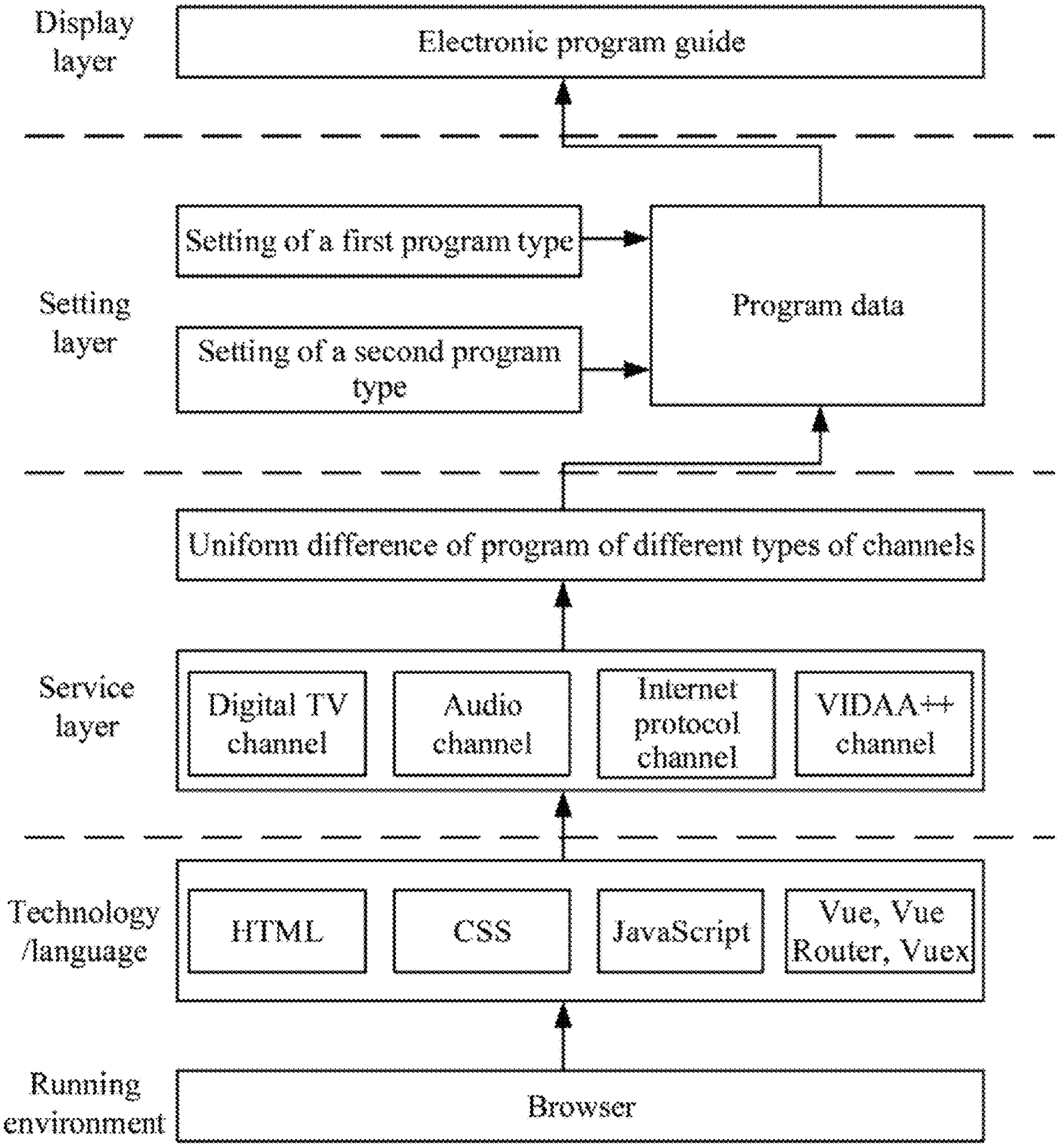
FIG. 5 shows an architecture diagram of an EPG application according to some embodiments.

When the user watches a program via the display apparatus 200, the display apparatus 200 displays an image corresponding to the program. The user may control the display apparatus 200 to display the electronic program guide (EPG) so as to determine a program of interest to the user through program information on the electronic program guide. In embodiments of the disclosure, the application layer is configured with an EPG application (EPG APP), and an architecture diagram of the EPG application may refer to FIG. 5. The EPG application runs on a browser, and various functions of the EPG application may be implemented based on HTML, cascading style sheets (CSS), JavaScript, Vue, Vue Router, Vuex and other techniques. The EPG application may be compatible with various channels and/or signal types, for example, a digital TV (DTV) channel, an audio channel, an Internet protocol (IP) channel, a channel (such as a VIDAA++ channel) provided by a VIDAA platform and the like.

In some embodiments, there are various forms of live broadcast sources for the television, including an analog signal ATV, a digital signal DTV, an Internet protocol television (IPTV), a VIDAA service and the like.

The ATV is a television system, in which the whole process including generation, transmission, processing of a television image signal, and restoration at the receiver side almost runs in analog model. However, a channel transmitting an analog signal cannot carry the program information, so the EPG application usually does not support the ATV.

DTV refers to a television system, in which source encoding, modulation, receiving and processing of audio, video and data signals based on digital technology. A digital signal may be transmitted not only in the DTV channel, but also in the audio channel (similar to a radio with a sound output but without image output) and may carry rich program information.

The IPTV is a new technology which uses a broadband cable television network, is integrated with the Internet, multimedia, communication and various other technologies and provides various interactive services including the digital TV for the user, and may obtain, through the network, the IP channel and program data provided by a third-party service provider.

VIDAA is a service provided by the display apparatus and is a technology for providing various interactive services including live broadcast or video-on-demand for the user based on the network. The VIDAA service may provide the VIDAA channel and the program data.

A setting layer of the EPG application is used for supporting the user to set parameters of various functions in the EPG application. A display layer of the EPG application is used for generating and displaying a corresponding user interface (namely, the electronic program guide) according to the parameters of the various functions provided by the setting layer.

Some embodiments of the disclosure provide a method for displaying an electronic program guide, applied to a display apparatus 200. The display apparatus 200 includes a display configured to display an image from broadcast system or Internet, and/or, a user interface; a communicator, configured to communicate with the network; a remote control, including a plurality of buttons; a memory, configured to store instructions and data associated with the display; and at least one processor, in connection with the display, the communicator and the memory.

Figure 6:
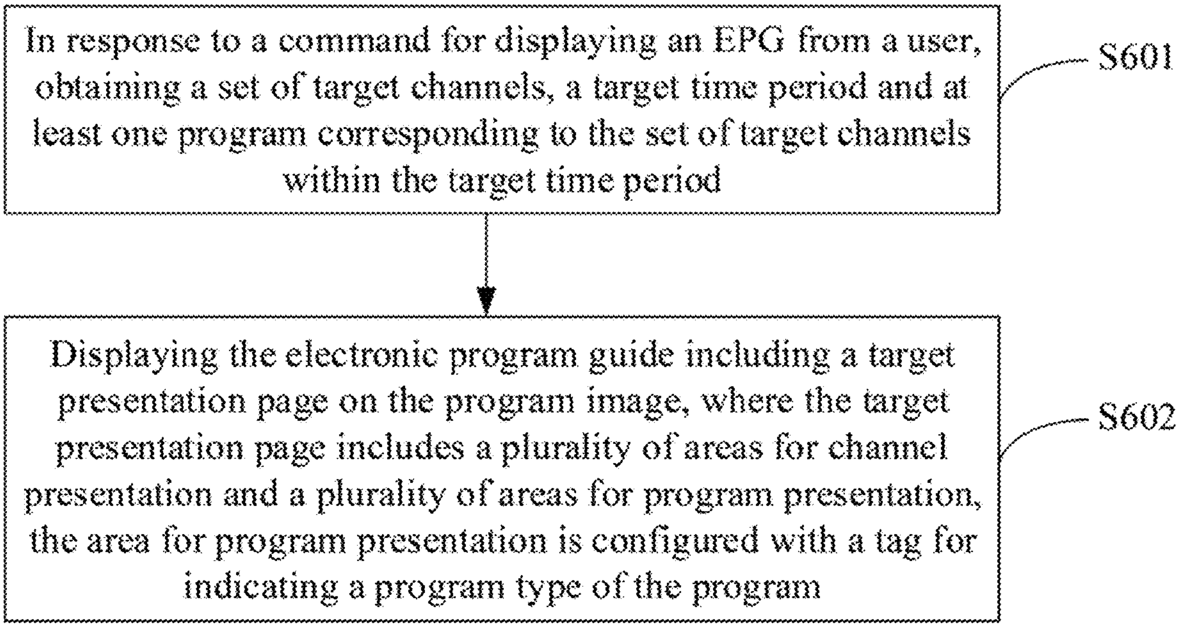
FIG. 6 shows a flowchart of a display method of the EPG according to some embodiments.

As shown in FIG. 6, the method includes the following steps.

S601, in response to a command for displaying an EPG from a user, the display apparatus 200 obtains a set of target channels, a target time period and at least one program corresponding to the set of target channels within the target time period. The set of target channels includes all channels for presentation on a target presentation page. The target time period refers to a time period of presentation on the target presentation page.

When watching a program on the display apparatus 200, the user may input a command for displaying the EPG on the display apparatus 200 via a control device 100 or a smart terminal 300 so as to control the display apparatus 200 to display the EPG. The display apparatus 200, when displaying a program image, receives the command and obtains data for forming the EPG in response to the command.

Taking the control device 100 being a remote control as an example, and the user inputs a command via pressing an EPG button (a Guide button on some remote controls) on the remote control. The display apparatus 200 receives the corresponding command, recognizes a key value of "EPG" or "Guide" in the command and determines that the command is used for displaying the EPG based on the recognized key value. The display apparatus 200 obtains the data for forming the EPG in response to the command so as to generate the EPG based on these data.

In embodiments of the disclosure, the data for forming the EPG include; a channel set (also denoted as a first channel set) of channels for presentation in the electronic program guide, a time period (namely, a display time period) for program information presentation and information of the programs.

The electronic program guide shows channels and the corresponding program information in N presentation pages, and N is a positive integer greater than 0. Each presentation page shows a preset number of channels and information of the programs corresponding to the preset number of channels within a specified time period. For example, program information of programs corresponding to 10 channels within 10:00-12:00 today is shown in the display page. The number of channels for presentation in the display page and the specified time period may be pre-configured by a designer or may also be set by the user. There is merely one presentation page in the electronic program guide that is shown when the electronic program guide is displayed every time. A target presentation page is a presentation page shown in the electronic program guide on the display apparatus 200 in response to the command. The set of target channels includes channels shown in the target presentation page, the target time period is a time period for presentation in the target presentation page, and at least one program corresponding to the set of target channels within the target time period is one or more programs corresponding to the programs displayed in the target presentation page.

Figure 7A:
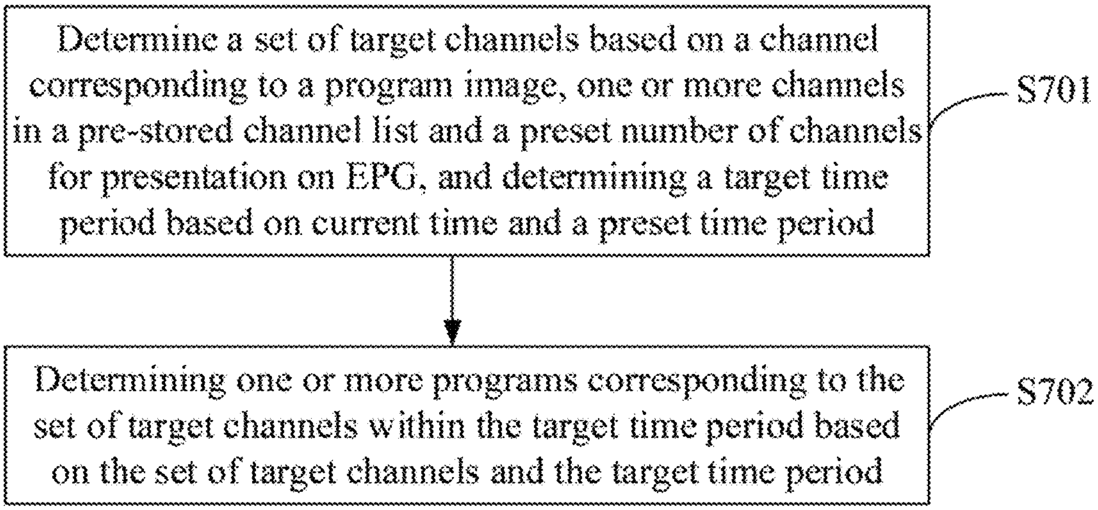
FIG. 7A shows a flowchart of determining a set of target channels, a target time period and a corresponding program corresponding to the set of target channels within the target time period according to some embodiments.

As shown in FIG. 7A, determining the set of target channels, the target time period and one or more programs corresponding to the set of target channels within the target time period, includes the steps as follows.

S701, the display apparatus 200 determines a set of target channels based on a channel corresponding to a program image, one or more channels in a pre-stored channel list and a preset number of channels for presentation on EPG, and determines a target time period based on current time and a preset time period.

The channel corresponding to the program image refers to a channel currently played on the display of the display apparatus 200. The one or more channels in the pre-stored channel list refers to pre-obtained and stored one or more channels in the display apparatus 200, which can be played by the display apparatus 200, and the channel may have corresponding program data or not. A target channel lists may be determined in the following manners.

In some embodiments, the channel corresponding to the program image is a first channel in the target channel list. Channels in the target channel list includes m channels starting with the channel corresponding to the program image among the channels in the pre-stored channel list, and m is equal to the preset number of channels for presentation. For example, the channels in the pre-stored channel list are channel 1 to channel 100 in sequence, that is, the pre-stored channel list includes 100 channels, it is assumed that the preset number of channels for presentation is 10, if the channel corresponding to the program image is channel 20, the channels in the target channel list may be channel 20 to channel 29.

In some embodiments, the channel corresponding to the program image is an ith channel in the target channel list. The pre-stored channel list includes P paged channel lists, P is a positive integer greater than 0, each paged channel list includes channels of the preset number of channels for presentation, channels in the different paged channel lists are different, and the P paged channel lists constitute the complete pre-stored channel list. Each presentation page of the EPG shows merely one paged channel list, a paged channel list shown in the target presentation page is the target channel list, and the paged channel list includes the channel corresponding to the program image. The target channel list meets the following formula (1):

$$\begin{cases} P_j = \text{floor}\left(\frac{C_n}{m}\right) + 1 \\ C_x = (P_j - 1) \times m + 1 \\ C_y = P_j \times m \end{cases}.$$

Here, $P_j$ represents the target channel list, and the target channel list is a jth paged channel list in the P paged channel lists; floor function gives a round-off number when a ratio has a remainder; $C_n$ represents that the channel corresponding to the program image is an nth channel in the pre-stored channel list; m represents the preset number of channels for presentation; $C_x$ represents that the first channel in the target channel list is an xth channel in the pre-stored channel list; and $C_y$ represents that the first channel in the target channel list is a yth channel in the pre-stored channel list.

For example, the channels in the pre-stored channel list are channel 1 to channel 100 in sequence, that is, the pre-stored channel list includes 100 channels, the preset number of channels for presentation is 10, if the channel corresponding to the program image is the 12th channel in the target channel list, the target channel list is the second paged channel list, the first channel in the target channel list is the 11th channel in the pre-stored channel list, and the last channel in the target channel list is the 20th channel in the pre-stored channel list. Accordingly, the channels in the target channel list are channel 11 to channel 20. Likewise, the first paged channel list are channel 1 to channel 10. The third paged channel list are channel 21 to channel 30.

In some embodiments, if the number of actual channels (channels belonging to the pre-stored channel list) in the target channel list is smaller than the preset number of channels for presentation, these actual channels are shown in sequence starting from a channel position corresponding to the first channel, and other channel positions in the target channel list are shown with null. Taking the channel corresponding to the program image being the first channel in the target channel list as an example, the channels in the pre-stored channel list are channel 1 to channel 100 in sequence, that is, the pre-stored channel list includes 100 channels, the preset number of channels for presentation is 10, if the channel corresponding to the program image is channel 99, the target channel list includes two actual channels which are channel 99 and channel 100, and the target channel list is shown by presenting channel names of channel 99 to channel 100 in the first to second channel positions in sequence and presenting null in the third to the tenth channel positions.

In embodiments of the disclosure, the current time refers to current system time (the system time is calibrated) of the display apparatus 200, and the display apparatus 200 obtains the current time by obtaining the current system time. The preset time period refers to a time range for presentation in the presentation page. The target time period refers to a preset time period including the current time. The target time period may be determined as follows.

In some embodiments, the current time is a start time of the target time period, and the preset time period refers to a duration. An end time of the target time period is time corresponding to a sum of the current time and the preset time period. For example, the current time is 10:00, and the preset time period is 2 hours, so the target time period is 10:00-12:00.

In some embodiments, the current time is a time point within the target time period, and the preset time period includes a specified start time and a specified end time. There are at least one preset time period, where the preset time periods are continuous and do not overlap with a period of time, and the preset time periods may constitute 24 hours of one day. The target time period is a preset time period including the current time, thus, the start time of the target time period is the start time of the preset time period(s), and the end time of the target time period is end time of the preset time period(s). For example, the current time is 10:00, if the preset time period includes 9:00-11:00 and 11:00-13:00, the target time period is 9:00-11:00.

In some embodiments, if the preset time period is the duration, for conveniently calculating the target time period for the display apparatus 200, the hour of the current time or the hour and the minute of the current time is used as the start time of the target time period.

In some embodiments, if the preset time period includes the specified start time and the specified end time, for conveniently determining the target time period for the display apparatus 200, the specified start time and the specified end time are set to show the hour, or show the hour and minute.

S702, the display apparatus 200 determines one or more programs corresponding to the set of target channels within the target time period based on the set of target channels and the target time period.

Program data of each channel corresponding to the target time period in the set of target channels are obtained. The channels in the set of target channels include various types, for example, a DTV channel, an Audio channel, an IP channel, a VIDAA++ channel and the like.

These different types of channels have different implementations for obtaining programs and also have different program data formats. An EPG application parses programs of different data sources respectively, and processes them respectively to convert into a uniform data format for function and interface display of the EPG application.

The DTV channel and the Audio channel come from a digital video broadcasting (DVB) system. The DVB standards provide a complete set of digital television system specifications suitable for different media, which is established based on an MPEG-2 standard compression algorithms.

Different types of the DVB standards can be used, for example, DVB-T, DVB-C, and DVB-S.

The modulation and demodulation modes of these DVB standards are different, but they are the same in source encoding and transformat, which are uniformly packed according to an MPEG-2 standard to form a transport stream (TS).

MPEG-2 standard is short for "information technology—generic coding of moving pictures and associated audio information". A basic bit rate is 4-8 Mbps and reaches as highest as 15 Mbps. The standard includes contents such as video and audio content. In the standard, program specific information (PSI) is defined specifically, which is used for accurately locating a program from a certain TS carrying a plurality of programs.

A PSI table defined in the MPEG-2 standard is a description for a single TS. As a plurality of TSs usually exist in a system, in order to guide a digital television user to quickly locate the needed service in the TSs, DVB expands the PSI of MPEG-2, and a table is added on the basis of four tables of PSI to form ServiceInformation (SI). The SI describes all the TSs of the whole system. The SI defined by the DVB standards is inserted into the transport stream (TS) meeting the MPEG-2 standard, so that a television may extract a list of programs and program information from the TS and display them for the digital television user visually, and thus the user may watch and select a television program more conveniently.

Tables in the PSI are as follows:

program association table (PAT);

conditional access table (CAT);

program map table (PMT); and network information table (NIT) (optional table).

Tables in SI are as follows:

service description table (SDT);

event information table (EIT);

time and date table (TDT);

network information table (NIT);

time offset table (TOT) (optional table);

boquet association table (BAT) (optional table);

application information table (AIT) (optional table); and other optional tables, such as a filling table.

Through the PSI and SI, searching and location all transmitted information such as program names and program classification as well as program contents and specific playing time the next many days are more conveniently and more quickly. The EPG function of the television provides program data to the user in a graphical mode and provides functions such as program marking and filtering, so that the user may mark different types of programs in the EPG according to the user's own preferences.

A program of an IPTV channel is obtained from a third-party service provider according to an HTTP protocol through a network. The program Array<IpProgram> in JSON format are obtained from service provider and uniformly parsed by an EPG module to be in an Array<Program> format for associated functions and program display.

A program of a VIDAA channel is a content provided by VIDAA service provider and is obtained, similar to the IPTV, from a service provider according to an HTTP protocol through network. The program Array<VidaaProgram> in JSON format are uniformly parsed by the EPG application to convert to an Array<Program> format for associated functions and program display.

Figure 7B:
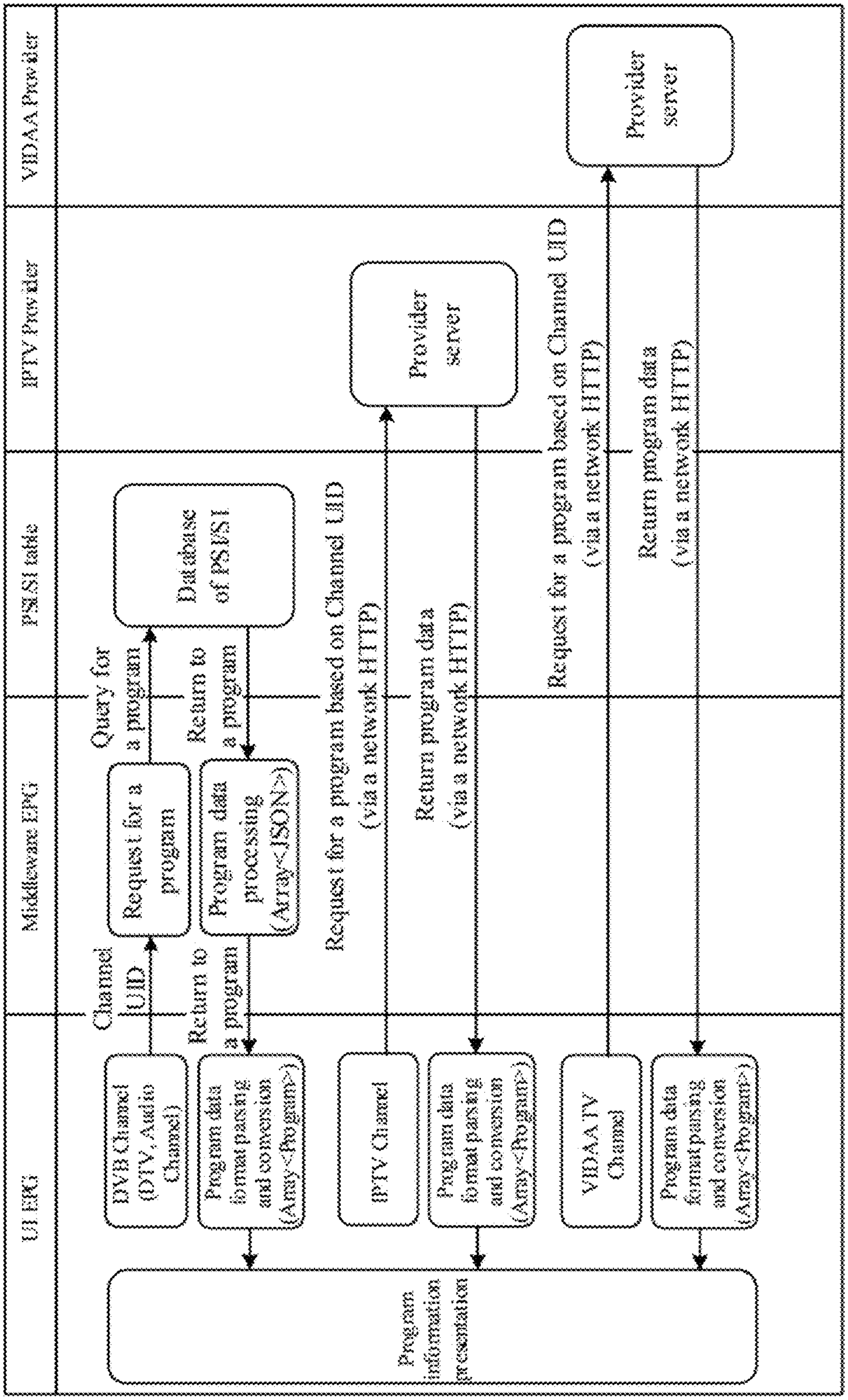
FIG. 7B shows a flowchart of interaction and integration for different channels and programs by EPG functions according to some embodiments.

Referring to FIG. 7B, which shows a flowchart of interaction and integration for different channels and programs by the EPG application. The EPG application respectively performs processing and converts to uniform data format Array<Program> for different channels and programs in different data formats mentioned above according to different specifications and standards. In an integration process, information such as the program name and program start time and end time is parsed and obtained. Besides, a Program.subtitle property is parsed and extracted for indicating whether a program has "Subtitle"; a Program.audio property is parsed and extracted for indicating whether a program has "audio language"; a Program.sign property is parsed and extracted for indicating whether a program has "sign language". Types of programs is parsed, and Program.theme is used for storage, values may be numbers from 1 to 15, then map match is performed with Genre data, and thus a type of each program may be obtained.

For example, types of program according to DVB related standard may include Movie, News, Shows, Sport, Children's, Music, Arts, Social, Education, Hobby, Series, Drama and Others. Here, the types may be different in different countries and regions.

Based on the program list defined in the MPEG-2 standard, theme information and component information (componentInfo) can be determined.

The theme information is denoted as a value. The EPG application can create a mapping list for the types of program based on the DVB standard, such as: 1=Movie, 2=News, 3=Shows, 4=Sport and so on. When parsing the theme data, the mapping list of program types can be referenced and the corresponding type of program can be determined. For example, if the value of theme data is 1, type of program can be determined as Movie based on the mapping 1=Movie; if the value of theme data is 4, type of program can be determined as Sports based on the mapping 4=Sports.

The componentInfo is a set of data including video, audio, and subtitle.

The EPG application can create a mapping list for componentInfo based on the DVB standard, which is two-dimensional data and the data format may be defined as follows:

1-1=video 4:3, 1-2=video 16:9, 1-3=video 16:9 HD;

2-1=audio single, 2-2=audio dual, 2-3=audio AD;

3-1=subtitle ttx. 3-2=subtitle VBI, 3-3=subtitle sign language.

The componentInfo data of program is a set of data including video, audio, and subtitle. Each item in the set of data includes two pieces of ID data which are streamID and componentID. The streamID corresponds to the one-dimensional data in the mapping list of componentInfo and the componentID corresponds to the two-dimensional data in the mapping list of componentInfo.

The set of componentInfo data of program may include, for example:

```
[
{streamId: 1, componentId: 3},
{streamId: 2, componentId: 3},
{streamId: 3, componentId: 3},
]
```

When parsing the set of componentInfo data of program, {streamId: 1, componentId: 3} can be obtained based on the first item of the set of componentInfo data of program, streamId is determined as a first dimensional data, and componentId is determined as a second dimensional data, and the data 1-3 can be obtained via combination of the first dimensional data and the second dimensional data, then 1-3=video 16:9 HD can be determined based on the mapping list of the componentInfo, which indicates that there is video of high definition displayed in 16:9 in the program.

{streamId: 2, componentId: 3} can be obtained based on the second item of the set of componentInfo data of program, and the data 2-3 can be obtained via combination of the first dimensional data and the second dimensional data, then 2-3=audio HD can be determined based on the mapping list of the componentInfo, which indicates that there is audio in the program, and the program is of audio description (AD) type.

{streamId: 3, componentId: 3} can be obtained based on the third item of the set of componentInfo data of program, and the data 3-3 can be obtained via combination of the first dimensional data and the second dimensional data, then 3-3=subtitle sign language can be determined based on the mapping list of the componentInfo, which indicates that there is subtitle in the program, and the program is of sign language (SL) type.

If there is no video content in the program, there is no item of streamID=1 in the corresponding set of componentInfo data. Here, streamID=1 indicates that there is the video content.

Likewise, if there is no audio content in the program, there is no item of streamID=2 in the corresponding set of componentInfo data. Here, streamID=2 indicates that there is the audio content.

If there is video, audio and subtitle content in the program, the componentInfo of the program is null, in this case, no data can be determined by parsing and matching with the mapping list.

Based on the theme data and componentInfo data of the program, information of the type of the program, whether there is sign language, and whether there is audio description can be determined. The determined information can be stored in the attribute information of the program. For example, the attribute information of the program can be described as follows:

```
Programme = {
theme = Movie,
subtitle = 1 (here 1 indicates that there is subtitle, and 0 indicates that there is no subtitle)
AD = 1 (here 1 indicates that there is AD, and 0 indicates that there is no AD)
SL = 1 (here 1 indicates that there is SL, and 0 indicates that there is no SL)
}
```

Based on the above, when setting of the type of program is changed, it is determined whether program corresponds to this type and then the interface may be changed accordingly. When setting of filter rule of the program is changed, it is determined whether the program supports the functions corresponding to the subtitle, AD, and SL, and then the interface may be changed accordingly.

While data of program of an IPTV channel obtained from a third-party service provider is maintained by the third party, and includes theme, subtitle, AD, SL data for use by the EPG application.

Data of program of a VIDAA channel obtained from VIDAA service provider is maintained by the VIDAA service provider, and includes theme, subtitle, AD, SL data for use by the EPG application.

The display apparatus 200 obtains program data corresponding to the target time period from a data source corresponding to a channel. For example, if it is the DTV channel, the program data are obtained from a digital television signal source.

The program data include a program name, start time, end time, program content and the like. The display apparatus 200 may determine the corresponding program of each channel in the set of target channels within the target time period based on the program data. For example, if the program data of Channel 11 within 10:00-12:00 obtained by the display apparatus 200 are "competition A, 10:00-11:30; advertisement B, 11:30-11:35; and news C, 11:35-12:00", programs of Channel 11 within 10:00-12:00 are competition A, advertisement B and news C in sequence according to a time sequence.

S602, the display apparatus 200 displays the electronic program guide including a target presentation page on the program image, where the target presentation page includes a plurality of areas for channel presentation and a plurality of areas for program presentation. The area for channel presentation is used for presenting a channel name. The area for program presentation is used for presenting a name of a program, and a length of each area for program presentation matches (such as being proportional to) a duration of the program. Each area for program presentation is labeled with a tag, the tag may be visual and the tag corresponds to a program type of the program in the area for program presentation.

The display apparatus 200 generates the electronic program guide, and the electronic program guide includes the target presentation page. The target presentation page is used for presenting corresponding channel data of the target channel list and program information of one or more corresponding programs in the target channel list within the target time period.

The target presentation page includes the plurality of areas for channel presentation, and the area for channel presentation is used for presenting the channel name. The number of the areas for channel presentation is equal to the number of channels in the target channel list, each area for channel presentation is used for presenting a name of one channel in the target channel list, and different areas for channel presentation are used for names of the different channels. All the areas for channel presentation are arranged longitudinally, each row includes an area for channel presentation. The name of each channel is shown in an area for channel presentation in sequence according to an arrangement sequence of all the channels in the target channel list.

The target presentation page includes a plurality of areas for program presentation, and the area for program presentation is used for presenting the program name. The number of the areas for program presentation is equal to the total number of the corresponding programs in each channel in the target channel list within the target time period, each area for program presentation is used for showing a name of this program, and the different areas for program presentation are used for showing names of the different programs. Areas for program presentation with names of programs belonging to the same channel are located in the same row, and areas for program presentation with names of programs belonging to different channels are located in different rows. The names of programs are shown in the areas for program presentation located in the same row in sequence from left to right according to a playing time of the programs.

The area for channel presentation and the areas for program presentation are shown in parallel, and the area for channel presentation and the area for program presentation which correspond to the same channel are located in the same row. Heights of the area for channel presentation and the area for program presentation located in the same row are the same. A width of each area for program presentation located in the same row matches a program duration of a corresponding program, that is, the longer the program duration is, the larger the width of the corresponding area for program presentation is. In some embodiments, a width of each area for program presentation may be obtained by calculation based on a ratio of a duration to a presentation width. Thus, the user may know a length of the program duration of each program by browsing the width of each area for program presentation.

In some embodiments, the electronic program guide may also include a time axis, and a time period corresponding to the time axis is same with the target time period. The time axis is shown above the area for program presentation, and time in the time axis is aligned with playing time of the corresponding program.

In some embodiments, the electronic program guide further includes a displaying window. The displaying window is used for displaying a program image currently played.

In some embodiments, the electronic program guide further includes a window for program detail. The window for program detail shows information of a program where a focus lands, and the information includes a channel corresponding to the program, the program name, the playing time, the program duration, a brief of the program and the like.

In some embodiments, the electronic program guide further includes an indicator line. The indicator line is shown in the area for program presentation and used for indicating the current time.

Figure 8:
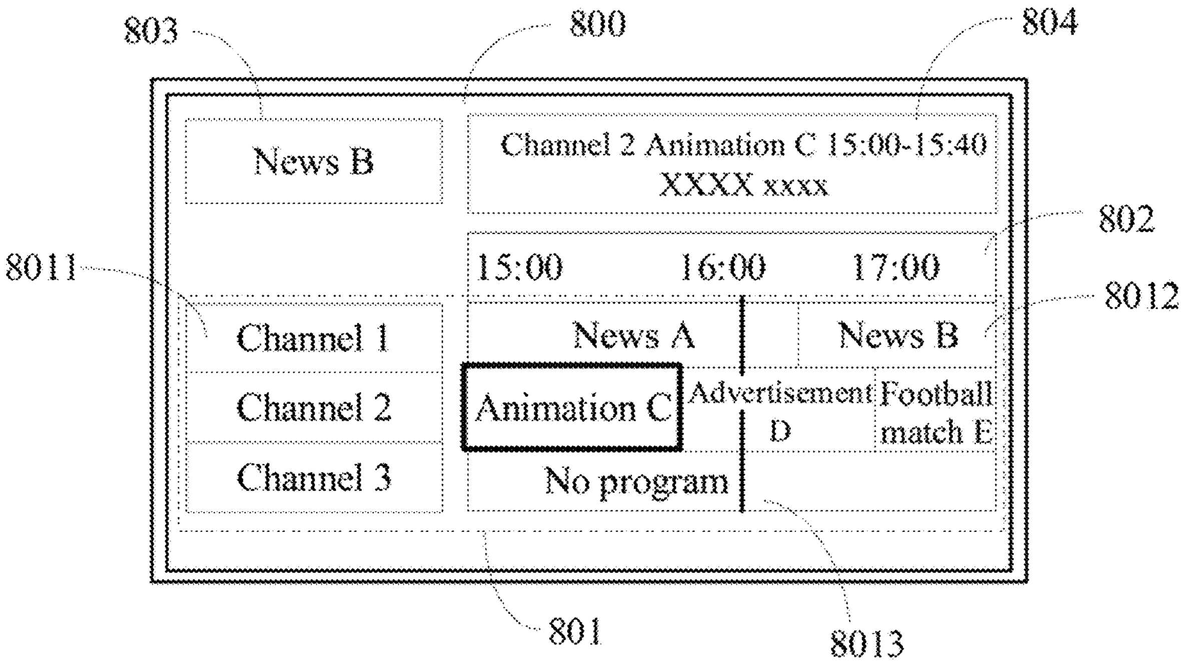
FIG. 8 shows a schematic diagram of an EPG according to some embodiments.

Description is made by taking the electronic program guide 800 shown in FIG. 8 as an example. The electronic program guide 800 includes the target presentation page 801, the time axis 802, the displaying window 803 and the window for program detail 804. The target presentation page 801 includes three areas for channel presentation 8011 and six areas for program presentation 8012. Channel 1 to Channel 3 in sequence from top to bottom are presented in the three areas for channel presentation 8011, the six areas for program presentation 8012 are presented below the time axis 802, the target time period corresponding to the time axis 802 is 15:00-17:00, and the names of the programs corresponding to Channel 1 to Channel 3 within 15:00-17:00 are presented in the six areas for program presentation 8012 respectively. The programs corresponding to Channel 1 include news A and news B, the programs corresponding to Channel 2 include animation C, an advertisement D and a football match E, Channel 3 has no program within the time period, and each area for program presentation 8012 matches the duration of the corresponding program. The indicator line 8013 is further presented in the target presentation page 801, and if the current time is 16:00, the indicator line 8013 is perpendicular to the time axis 802 and corresponds to the time 16:00 on the time axis 802. If the currently played channel is Channel 1, a program image corresponding to the news B is displayed in the displaying window 803. If the focus (indicated by a bold black solid box) falls on animation C, information corresponding to animation C is shown in the window for program detail 804, such as "Channel 2, animation C, 15:00-15:40, mainly tells that x x x ".

It may be known from the electronic program guide 800 that the larger the number of the channels for presentation in the electronic program guide 800 is and/or the longer the presentation time period is, the more the names of programs in the electronic program guide 800 are, and the denser the arrangement of the areas for program presentation is. If the user determines a program of interest by browsing the program names, the dense areas for program presentation are inconvenient to browse for the user, identification difficulty is increased for the user, and moreover, the user tends to mistakenly identify other programs as the program of interest.

In view of the above issues, a tag is added to each area for program presentation 8012, the added tag corresponds to the program type of the program in the area for program presentation, and the same program type corresponds to the same tag. In embodiments of the disclosure, the tag should be easy to identify and distinguish, for example, using a simple-shaped tag, using a distinct color, a larger difference between different tags and the like. Thus, the user, when browsing the electronic program guide, may quickly identify the tag on each area for program presentation and quickly and accurately distinguish different tags, so as to quickly and accurately determine the program type of the program corresponding to each tag, and thus determine whether it is the program of interest based on the program type of the program.

Figure 9:
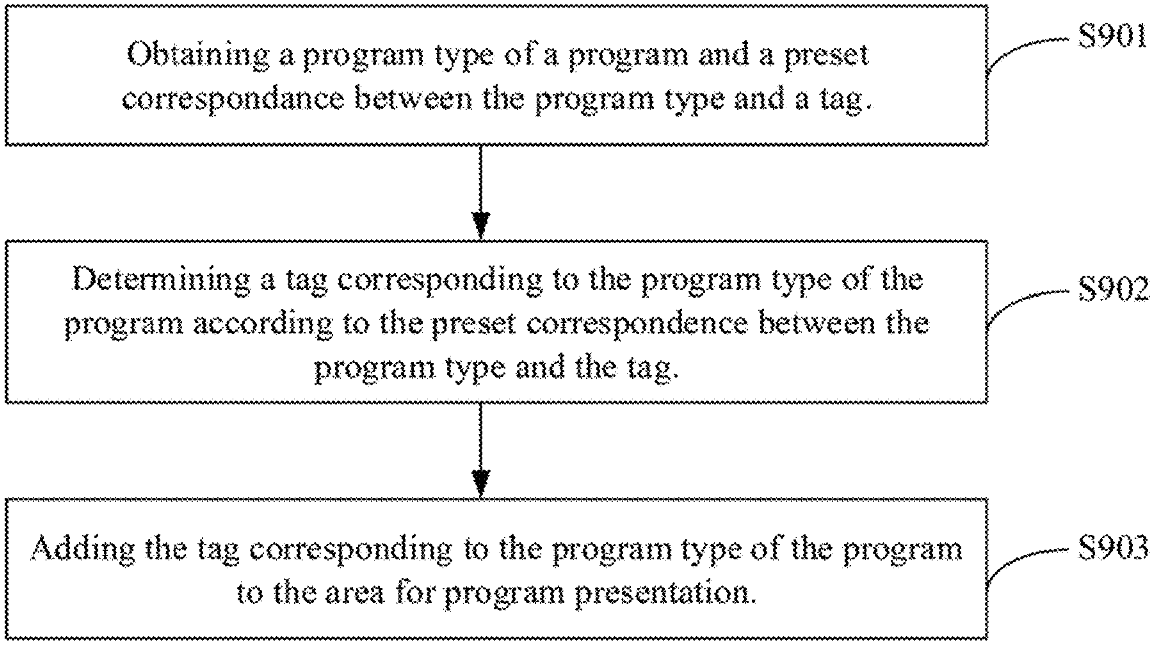
FIG. 9 shows a flowchart of adding a tag to an area for program presentation according to some embodiments.

The display apparatus 200 may add the tag to each area for program presentation, as shown in FIG. 9, and specific steps are as follows.

S901, the display apparatus 200 obtains a program type of a program and a preset correspondence between the program type and a tag.

The display apparatus 200 obtains program data of each channel in the set of target channels corresponding to the target time period when determining the corresponding programs in the set of target channels within the target time period. A process of obtaining the program data is similar to S702 and is not repeated in detail here.

In embodiments of the disclosure, the program data include program data of a first type. The program data of the first type includes basic data such as the program names, start time, end time and the program content. The program data further include program data of a second type, and the program data of the second type includes data related to the program content and data for indicating the program type.

In some embodiments, the program type may be classified according to the program content, and this program type may be referred to as a first program type. These program types are obtained from channels based on the DVB broadcast signal standards, such as the DTV channel, the Audio channel and the IP channel based on DTV. For example, the first program type corresponding to program data may be determined by recognizing Genre data in the program data. The Genre data include: Movie, News and Factual, Entertainment, Shows, Music, Sport, Children's, Education, Lifestyle, Drama, Unclassified, News, Social, Series, Others and the like. Taking Genre data being Movie as an example, the corresponding first program type is a movie type. Each program belongs to one type of the first program type, so all the programs in the electronic program guide may be classified according to the program contents according to the first program types.

In some embodiments, the program types may be classified according to function data carried in the program contents, and this program type is referred to as a second program type. These program types are also obtained from channels based on the DVB broadcast signal standards, such as the DTV channel, the Audio channel, and the IP channel based on DTV. For example, the second program type corresponding to program data may be determined by recognizing the function data in the program data. The function data include: Subtitle, Audio Description. Sign Language and the like. Each program may include N pieces of function data, N is a positive integer greater than 0, that is, each program may provide one or more functions. Taking the function data including Subtitle as an example, the corresponding program type is a type providing a subtitle. Taking the function data including Subtitle and Sign Language as an example, the corresponding second program type is a type for providing the subtitle and a type for providing the sign language.

In embodiments of the disclosure, the correspondence between the program type and the identifier may be preconfigured for the display apparatus 200, that is, a default correspondence, or may also be defined by the user. For conveniently distinguishing the program types corresponding to different classifying schemes (namely, the first program type and the second program type), the first program type and the second program type correspond to different tags, the first program type corresponds to a first type of tag, and the second program type corresponds to a second type of tag.

Figure 10:
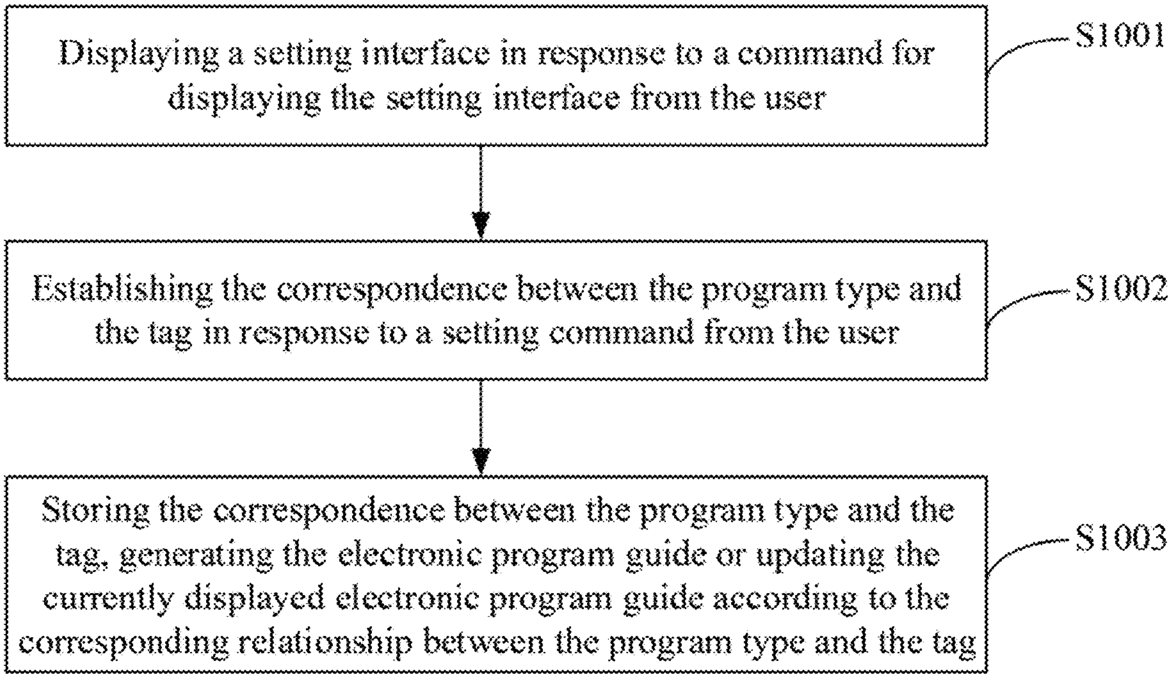
FIG. 10 shows a flowchart of generating an EPG according to some embodiments.

If the correspondence between the program type and the identifier (for example, the tag) is defined by the user, the user may set the corresponding relationship between the program type and the tag after the display apparatus 200 displays the electronic program guide. As shown in FIG. 10, specific steps are as follows.

S1001, the display apparatus 200 displays a setting interface in response to a command for displaying the setting interface from the user. The setting interface is used for setting the correspondence between the program type and the tag by the user.

The setting interface includes a first setting interface and a second setting interface, the first setting interface is used for the user to select the first type of tag to be used and select the first program type marked with the selected first type of tag and may be referred to as a program type setting interface. The second setting interface is used for the user to select the second program type to be highlighted, which is the program type preferred by the user, and accordingly the second setting interface may be referred to as a preference program setting interface.

S1002, the display apparatus 200 establishes the correspondence between the program type and the tag in response to a setting command from the user.

The user sets the correspondence between the program type and the tag on the different setting interfaces, that is, the user sets the correspondence between the first program type and the first type of tag on the first setting interface and sets the correspondence between the second program type and the second type of tag on the second setting interface.

S1003, the display apparatus 200 stores the correspondence between the program type and the tag and generate the electronic program guide and the tag or update the currently displayed electronic program guide, according to the corresponding relationship between the program type.

In some embodiments, there is no tag in the electronic program guide currently displayed on the display apparatus 200. That is, there is no pre-stored corresponding relationship between the program type and the tag. The user sets the corresponding relationship between the program type and the tag to enable the respective programs to be displayed with tags for classifications. In some embodiments, the electronic program guide currently displayed on the display apparatus 200 has presented the tag corresponding to the program type on the area for program presentation. That is, there is the pre-stored corresponding relationship between the program type and the tag, for example, the corresponding relationship set by the user last time. The user updates the tag displayed on the area for program presentation by setting the corresponding relationship between the program type and the tag.

The following specific description is made for the user setting the correspondence between the program type and the tag based on the different setting interfaces.

The first program type is mainly based on classification of the program contents without filtering of the program contents, thus, the first type of tag may adopt schematic tags without affecting functions (such as a function for selection and a display function) of the area for program presentation, for example, an icon (including a style, color and the like of the icon), a color of the area for program presentation, a pattern of the area for program presentation, a font color of the program name and the like. Different first program types may have different tags of the first type.

In some embodiments, the first program type is determined according to genre data in program source signals, and the genre data includes one or more of: Movie, News, Entertainment, Shows, Music, Sport. Children's. Education, Lifestyle, Drama, Unclassified, Social, or Series.

Figure 11:
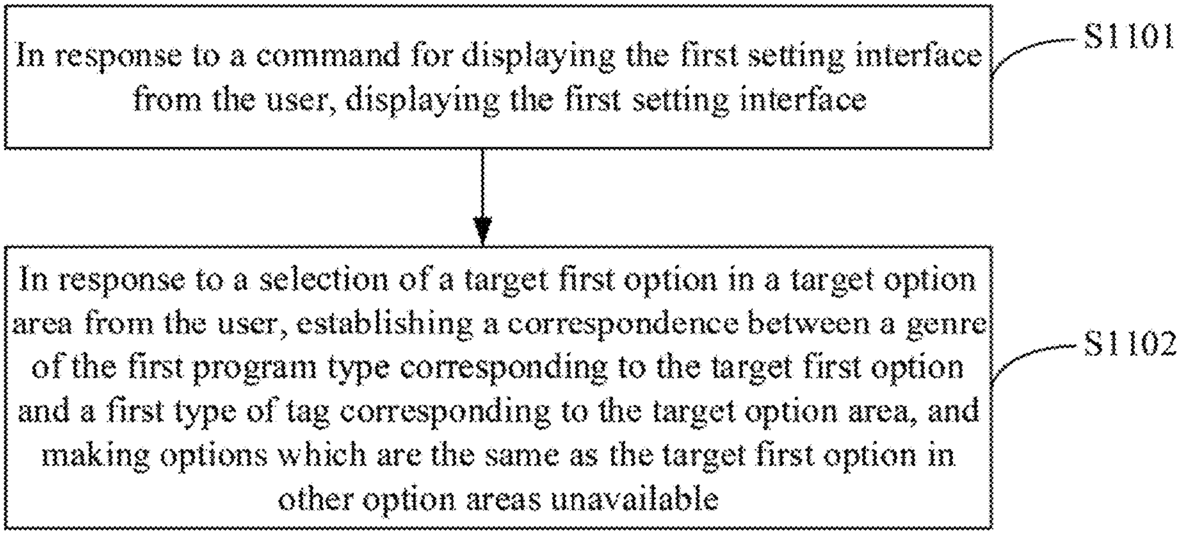
FIG. 11 shows a flowchart of establishing a corresponding relationship between a first program type and a first type of tag according to some embodiments.

The correspondence between the first program type and the first type of tag may be established with reference to a flow shown in FIG. 11, and specific steps are as follows.

S1101, in response to a command for displaying the first setting interface from the user, displaying the first setting interface. The first setting interface includes an option area for showing at least one tag of the first type, the option area of tags of the first types includes at least one first option, and each first option is configured for a genre of a first program type.

The user inputs a command for displaying the first setting interface via a control device or a smart terminal. Taking the control device 100 being the remote control as an example, the command is input via pressing a specified button (a key value of the specified button has a mapping relationship with the command for displaying the first setting interface) on the remote control, so as to cause the display apparatus 200 to display the first setting interface.

The first setting interface includes at least one first type of tag, so as to provide all first types of tags to be presented on the area for program presentation for the user. Each first type of tag has a corresponding option area, the option area includes at least one first option, each first option corresponds to a first program type, the option area may include the first options corresponding to all the first program types or the first options corresponding to a part of first program types, this part of first program types may include a program type with a higher historical viewing frequency of the user, a valid program type (excluding unclear program types of Unclassified, Others and the like), a program type included in program data of a program of each channel in the target channel list within the target time period, and the like. The first options in respective option areas may correspond to different first program types, or may correspond to the completely same first program type, or may also correspond to some of the first program types.

S1102, in response to a selection of a target first option in a target option area from the user, establishing a correspondence between a genre of the first program type corresponding to the target first option and a first type of tag corresponding to the target option area, and making options which are the same as the target first option in other option areas unavailable.

The selection is input via the control device 100 or the smart terminal 300. Description is made by taking the control device 100 being the remote control as an example, the user controls the focus of the remote control to move to the to-be-selected option area (namely, the target option area) of the first type of tag and moves the focus to the to-be-selected first option (namely, the target first option) in the target option area, and the user inputs the selection by pressing a "confirm" button on the remote control. The display apparatus 200 receives the command and recognizes that the focus is located on the target first option and that the target first option is located in the target option area, and thus, the corresponding relationship between the target first option and the first type of tag corresponding to the target option area is determined, and the display apparatus 200 establishes the correspondence between the genre of the first program type corresponding to the target first option and the first type of tag corresponding to the target option area. The correspondence between the genre of the first program type corresponding to the target first option and the first type of tag corresponding to the target option area is used for indicating that the area for program presentation corresponding to the first program type is labeled with the tag of the first type in the electronic program guide.

The areas for program presentation labeled with the different styles of the first type of tags, the areas for program presentation corresponding to the different first program types may be labeled according to categories, so the user may quickly classify the program corresponding to each area for program presentation according to the first type of tags and accurately know the program types of the programs in the area for program presentation.

The target first option is labeled with a first selection tag, and the first selection tag is used for indicating that the target first option is selected in the target option area. The first selection tag may be an icon, a background color of the first option, a background pattern and the like, or may also be a font color in the first option and the like. Another first option the same as the target first option in the other option areas is labeled with a second selection tag, and the second selection tag is used for indicating that the first option has been selected in an option area (the target option area) rather than the other option areas. The second selection tag may indicate a state of the first option so as to prevent the user from reselecting. For example, the second selection tag may indicate that the first option is unavailable for selection.

S1101 to S1102 are described with reference to the following examples.

Taking the control device 100 being the remote control as an example, a Green button on the remote control is configured to be a button associated with a command for displaying the first setting interface. The command with a key value "Green" to the display apparatus 200, the display apparatus 200 recognizes the key value "Green" and determines that the command is used for displaying the first setting interface, and the display apparatus 200 displays the first setting interface in response to the command. The first setting interface may be shown as that in FIG. 12. Taking the first type of tag being a line control with color as an example, the first setting interface includes three tags of the first type, which are respectively an orange line (shown by an oblique line pattern), a red line (shown by a bold black solid line), and a blue line (shown by a checked pattern). The orange line corresponds to the option area 1201, the red line corresponds to the option area 1202, and the blue line corresponds to the option area 1203. Two ends of each option area are provided with extended characters 1204 respectively, and the extended characters 1204 are used for adjusting first options displayed in the option area.

The user moves the focus via the remote control to the option area 1201 corresponding to the orange line and moves the focus to the first option for the NEWS, and the user inputs the selection to the display apparatus 200 by pressing the "confirm" button on the remote control. The display apparatus 200 establishes a corresponding relationship between the NEWS and the orange line in response to the selection, labels the first option of the news with the first selection tag, such as making a font of the NEWS bold, so as to prompt the user that first option has been selected, and shows the program type of the currently selected first option near the tag of the orange line. The first options corresponding to news in the option area 1202 and the option area 1203 are labeled with the second selection tag, for example, the first option corresponding to the news in the option area 1202 is marked as unavailable, so as to prompt the user that the first option is unavailable. With reference to the above flow, a corresponding relationship between SPORT and the red line as well as a corresponding relationship between KID'S and the blue line may be established, which is not repeated in detail here.

In S1201 to S1202, the user uses all tags of the first type provided by the first setting interface. In some embodiments, the user may use a part of tags of the first type or may not use the tags of the first type.

In some embodiments, display for the first type of tag may be canceled with reference to the following steps.

Based on the first setting interface obtained in S1201, the option area corresponding to each first type of tag further includes a cancel option, and the cancel option is used for indicating not to display the corresponding first type of tag. After displaying the first setting interface, the display apparatus 200 establishes a corresponding relationship between a target cancel option and the corresponding first type of tag in response to a selection of the target cancel option from the user.

Figure 12:
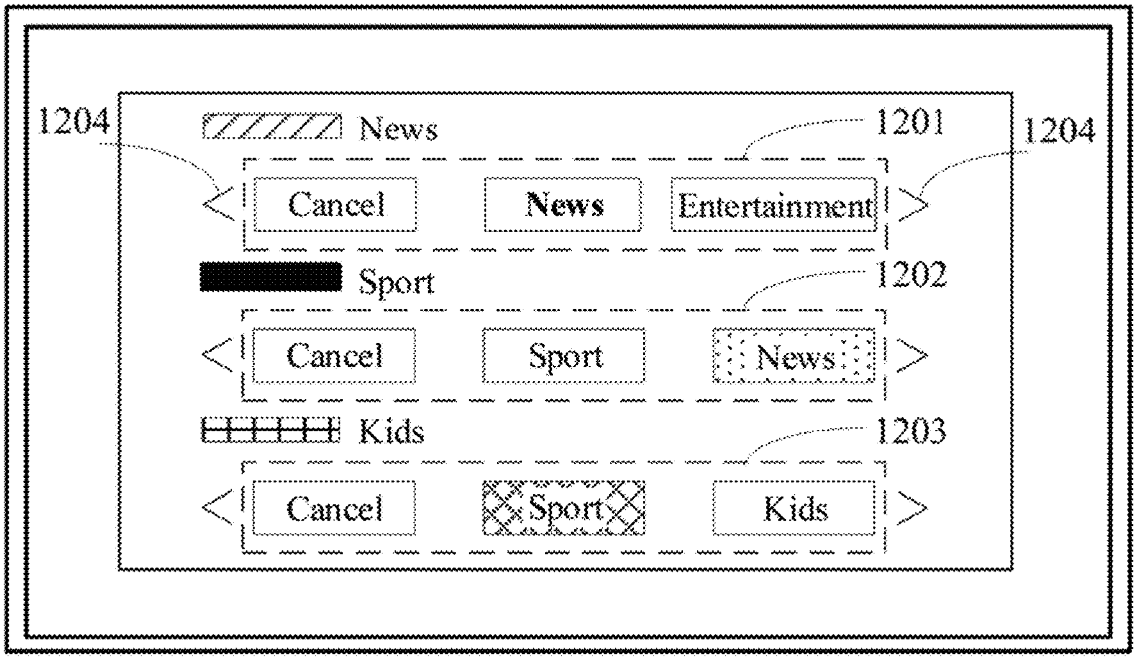
FIG. 12 shows a schematic diagram of a first setting interface according to some embodiments.

The above process of canceling display for the first type of tag is described with reference to one example, taking the control device 100 being the remote control and the first setting interface as shown in FIG. 12 as an example. The option area 1201, the option area 1202 and the option area 1203 each include a cancel option. If the user does not want to display the red line, the user controls the remote control to move the focus to the cancel option in the option area 1202, and inputs the selection by pressing the "confirm" button on the remote control. The display apparatus 200 establishes a corresponding relationship between the cancel option and the red line in response to the selection, so the display apparatus 200 does not display the red line on the electronic program guide. Likewise, a corresponding relationship between the cancel option and the orange line as well as a corresponding relationship between the cancel option and the blue line may be established.

The second program type is mainly based on functions provided by the program contents, and the function data includes one or more of Subtitle, Audio Description, or Sign Language. The second type of tag may be a tag for adjusting a display state of the area for program presentation, for example, reducing opacity of the area for program presentation, or making the area for program presentation be unavailable for selection and the like.

Figure 13A:
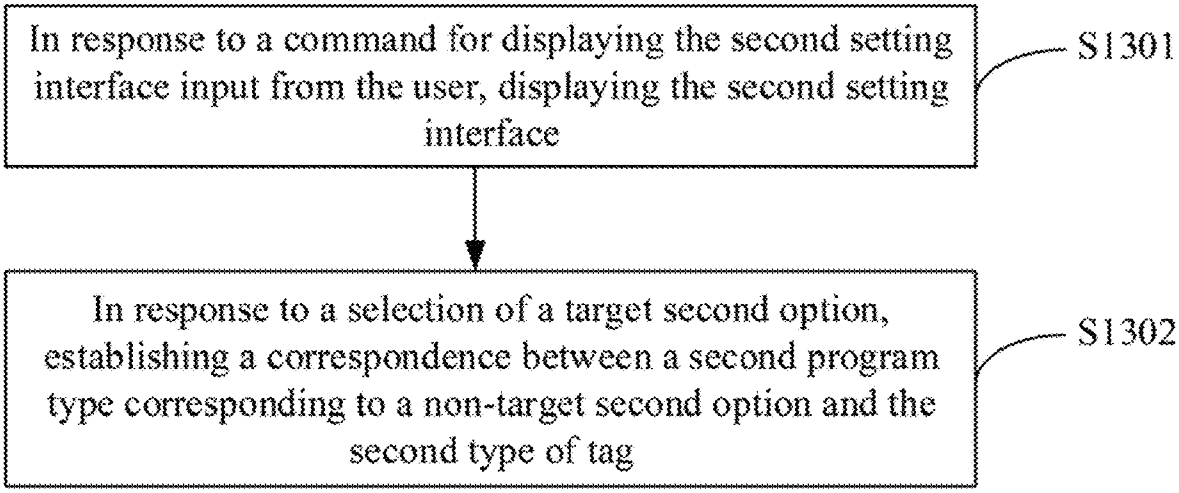
FIG. 13A shows a flowchart of establishing a corresponding relationship between a second program type and a second type of tag according to some embodiments.

A corresponding relationship between the second program type and the second type of tag may be established with reference to a flow shown in FIG. 13A, and specific steps are as follows.

S1301, in response to a command for displaying the second setting interface input from the user, displaying the second setting interface. The second setting interface includes at least one second option, and each second option corresponds to a second program type.

The user inputs a command by controlling the control device 100 or the smart terminal 300, and the command is used for displaying the second setting interface. Taking the control device 100 being the remote control as an example, the user inputs a command to the display apparatus 200 by pressing a specified button (a key value of the specified button has a mapping relationship with the command for displaying the second setting interface) on the remote control, so as to cause the display apparatus 200 to display the second setting interface.

Figure 13B:
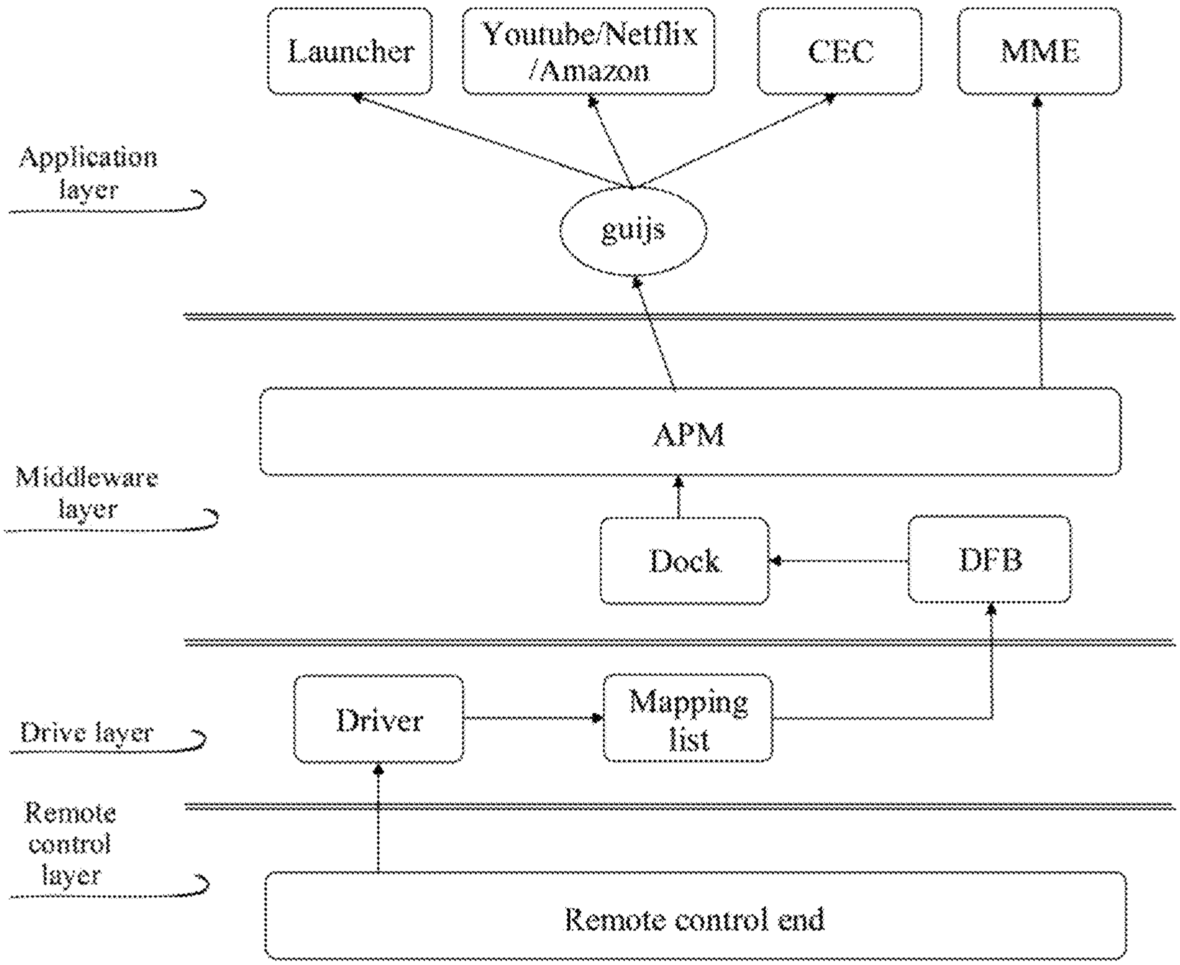
FIG. 13B shows a flowchart of assigning keys on a remote control according to some embodiments.

In some embodiments, referring to FIG. 13B, a distribution and transmission flow of a button event comprises the following steps.

1. A remote control sends a command corresponding to button according to NEC protocol, and the command reaches a television drive layer.
2. The drive layer parses the command, then distributes it to a corresponding key value, and sends it to a middleware layer; and the command is sent to a module being used by the user via APM middleware.
3. If a third-party application is currently used, such as Youtube and Netflix, the command will be forwarded to the application, and the application processes the command by itself. If Launcher UI is currently used, the command is forwarded to a UI layer, and the UI layer distributes the command to a currently open page.

When the user is using the EPG function, the remote control will send the command (key value) corresponding to a button to the current open EPG page according to the above flow, and the EPG module receives the command and then perform an operation according to the command.

The second setting interface includes at least one second option, so that the user selects a second option, namely, a target second option, corresponding to the second program type to be highlighted. A second program type corresponding to a second option except for the target second option is a second program type which does not need to be highlighted, namely, a non-target second option. The second option may include second options corresponding to all second program types, or may also include second options corresponding to a part of second program types, and this part of second program types may be a program type used by the user before, a program type corresponding to user information (such as health information and preference information) and the like.

S1302, in response to a selection of a target second option, establishing a correspondence between a second program type corresponding to a non-target second option and the second type of tag. The non-target second option includes a second option except for the target second option.

Here, the correspondence can be established based on the theme data and the componentInfo data of the program described above.

The user selects the target second option via the control device 100 or the smart terminal 300. Description is made by taking the control device 100 being the remote control as an example, the user controls the focus to move to the to-be-selected second option (namely, the target second option), and the user inputs a selection to the display apparatus 200 by pressing the "confirm" button on the remote control. The display apparatus 200 receives the selection instruction and recognizes that the focus is located on the target second option. The display apparatus 200 determines the non-target second option according to the target second option and the corresponding relationship between the second program type corresponding to the non-target second option and the second type of tag is determined, and the display apparatus 200 establishes the correspondence between the second program type corresponding to the non-target second option and the second type of tag. The correspondence between the second program type corresponding to the non-target second option and the second type of tag is used for indicating that the area for program presentation corresponding to the second program type is labeled with the second type of tag in the electronic program guide.

Based on the tag of the second type (reducing opacity of the area for program presentation and making the area for program presentation be unavailable and the like), the area for program presentation labeled with the second type of tag is lower in opacity or unavailable, thus, the area for program presentation not labeled with the second type of tag, namely, the area for program presentation corresponding to the target second option is higher in opacity or is displayed in a normal available state, so as to achieve an effect of highlighting and displaying the area for program presentation corresponding to the target second option, and an effect of preventing the user from mistakenly selecting the area for program presentation corresponding to the non-target second option.

The target second option is labeled with a third selection tag, and the third selection tag is used for indicating that the target second option has been selected. The third selection tag may be an icon, a background color of the second option, a background pattern and the like, or may also be a font color in the second option and the like.

S1301 to S1302 are described with reference to the following examples.

Taking the control device 100 being the remote control as an example, a menu button on the remote control is configured to be a button associated with the command, the user inputs the command with a key value "Menu" to the display apparatus 200 by pressing the Menu button, the display apparatus 200 recognizes the key value "Menu" and determines that the command is used for displaying the second setting interface, and the display apparatus 200 displays the second setting interface in response to the command. The second setting interface may refer to FIG. 14, and the second program type includes displaying a program with an audio description, displaying a program with a subtitle, and displaying a program with a sign language. Taking a target second program type being displaying the program with sign language as an example, the user moves the focus to displaying the program with the sign language, and inputs the selection by pressing the "confirm" button. The display apparatus 200 establishes correspondences between the audio description and second type of tag as well as between the subtitle and the second type of tag respectively in response to the selection, and the second type of tag is making the area for program presentation be unavailable in an example. The display apparatus 200 labels the second option of displaying the program with the sign language with the third selection tag, for example, a check mark is labeled on a right side of the second option of displaying the program with the sign language, so as to prompt the user that the second option has been selected. The user may select other second options as the target second option, and a selection process is similar to the process of selecting displaying the program with the sign language as the target second option. If the user selects other second options as the target second option, the currently selected target second option will change to the non-target second option, and the corresponding third selection tag is removed.

In some embodiments, the selection on the second option can be cancelled, reference may be made to the following steps.

The display apparatus 200 establishes a corresponding relationship between a to-be-canceled second option and the second type of tag in response to a cancel command from the user on the to-be-canceled second option. The to-be-canceled second option refers to a selected second option. If all the second options are not selected, the stored corresponding relationship between the second program type and the second type of tag is deleted.

Figure 14:
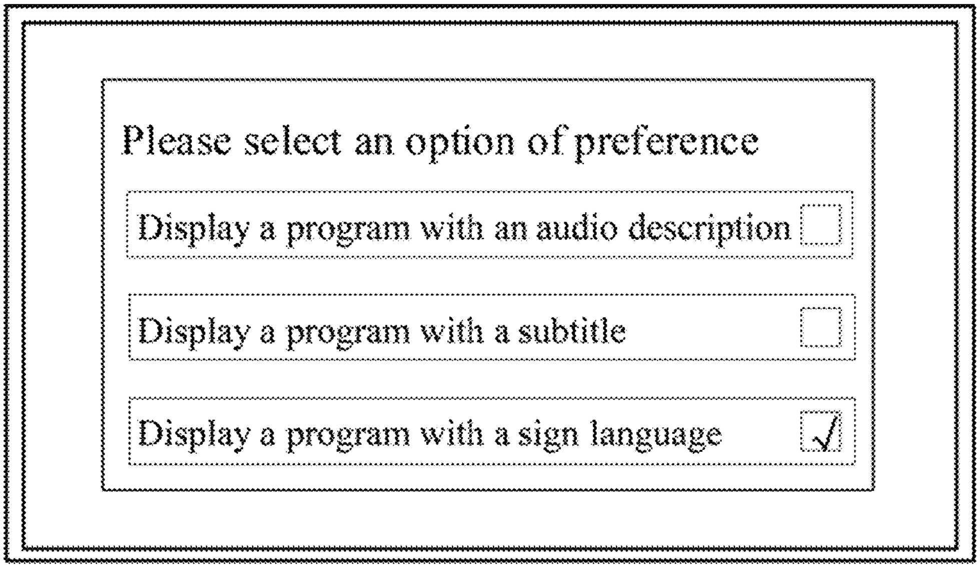
FIG. 14 shows a schematic diagram of a second setting interface according to some embodiments.

Taking the control device 100 being the remote control and the second setting interface shown in FIG. 14 as an example, after displaying the second setting interface, the user moves the focus to the second option (currently selected second option) of displaying the program with the sign language, and inputs the cancel command by pressing the "confirm" button. The display apparatus 200 establishes a corresponding relationship between the sign language and the second type of tag in response to the cancel command. In this example, after cancelling the selection on the second option of displaying the program with the sign language, all the second options are not selected, and the stored corresponding relationship between all the second program types and the second type of tag is deleted. In this way, the second type of identifier or tag will not be displayed on the electronic program guide.

The user may set the correspondence between the first program type and the first type of tag, or the correspondence between the second program type and the second type of tag, or the correspondence between the first program type and the first type of tag as well as the correspondence between the second program type and the second type of tag.

After establishing the correspondence between the program type and the tag based on the above flow, the display apparatus 200 stores the established correspondence so as to display the corresponding tag on the area for program presentation based on the stored corresponding relationship when displaying the electronic program guide. For example, the corresponding relationship between the program type and the tag may be stored in a memory as an Object.

In some embodiments, when the user changes the first program type or the second program type via a setting page, in this case, a latest value after change will be broadcast to each piece of program Object<Program> data. The program, after receiving the broadcast, matches a latest genre value with its own program property, such as theme and subtitle and makes a change on an interface according to a matching result.

For example, the user opens the setting page by pressing the "Menu" button and selects "displaying a program with a subtitle". In this case, the setting page may broadcast the change to each program (via data in JSON format: {"audio": false, "subtitle": true, "sign": false}), the program receives the broadcast and the data in JSON format, and determines that "subtitle" is selected and "audio" and "sign" are not selected, then whether the program has "subtitle" is determined, and a change (whether making it unavailable and the like) of the interface is made according to the determination result.

The display apparatus 200 obtains the corresponding relationship, pre-stored in the memory, between the program type and the tag in response to the command in S601.

S902, determining a tag corresponding to the program type of the program according to the preset correspondence between the program type and the tag.

The display apparatus 200 may determine a tag corresponding to a program in each area for program presentation in the target presentation page according to the obtained corresponding relationship between the program type and the tag. For example, taking the correspondence between the program type and the tag being the correspondence between the NEWS and the orange line as an example, if a program corresponding to the area for program presentation is "news A", a program type of the "news A" is NEWS, and the tag corresponding to the "news A" is the orange line.

S903, adding the tag corresponding to the program type of the program to the area for program presentation.

In some embodiments, the corresponding relationship between the program type and the tag pre-stored in the display apparatus 200 includes: the correspondence between the first program type and the first type of tag. In these embodiments, the display apparatus 200 determines the area for program presentation corresponding to the first program type, namely, a first area for program presentation, and the corresponding first type of tag is added to the first area for program presentation.

With reference to example 1, taking the electronic program guide shown in FIG. 8, the correspondence between the first program type and the first type of tag including: NEWS corresponding to the orange line, SPORT corresponding to the red line and CHILDREN'S corresponding to the blue line as an example. The display apparatus 200 recognizes the first program type of the program in each area for program presentation, for example, the first program type corresponding to news A and new B is NEWS, the first program type corresponding to animation C is CHILDREN'S, and the first program type corresponding to football match E is SPORT. The display apparatus 200 adds the orange line to the area for program presentation corresponding to news A and news B, adds the blue line to the area for program presentation corresponding to animation C and adds the red line to the area for program presentation corresponding to football competition E. The display apparatus 200 adds the corresponding first type of tag at a lower frame of the area for program presentation, and displays the electronic program guide shown in FIG. 15. Thus, the user may quickly know that the program corresponding to each area for program presentation is classified based on the first type of tag and accurately know the program type of the program in the area for program presentation.

Figure 15:
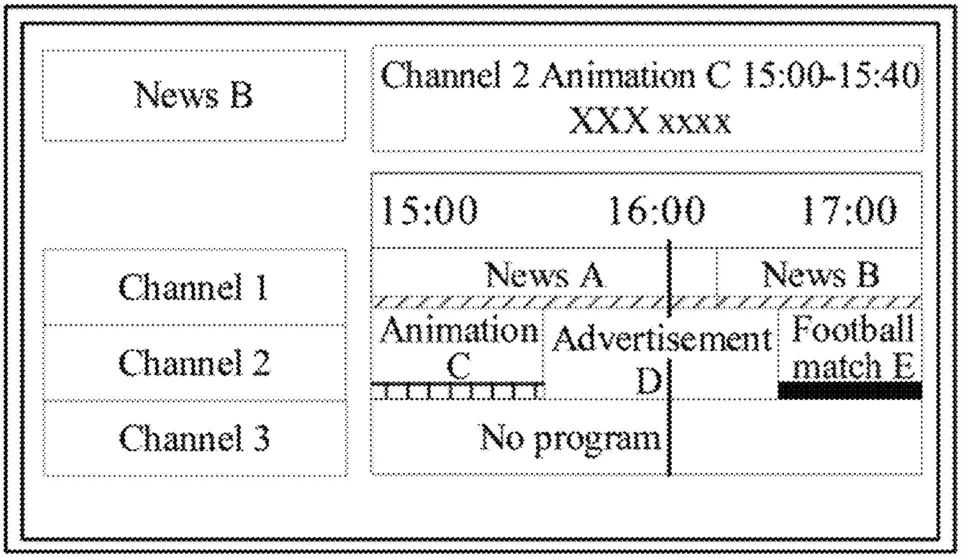
FIG. 15 shows a schematic diagram of an EPG with all first type of tags according to some embodiments.
Figure 16:
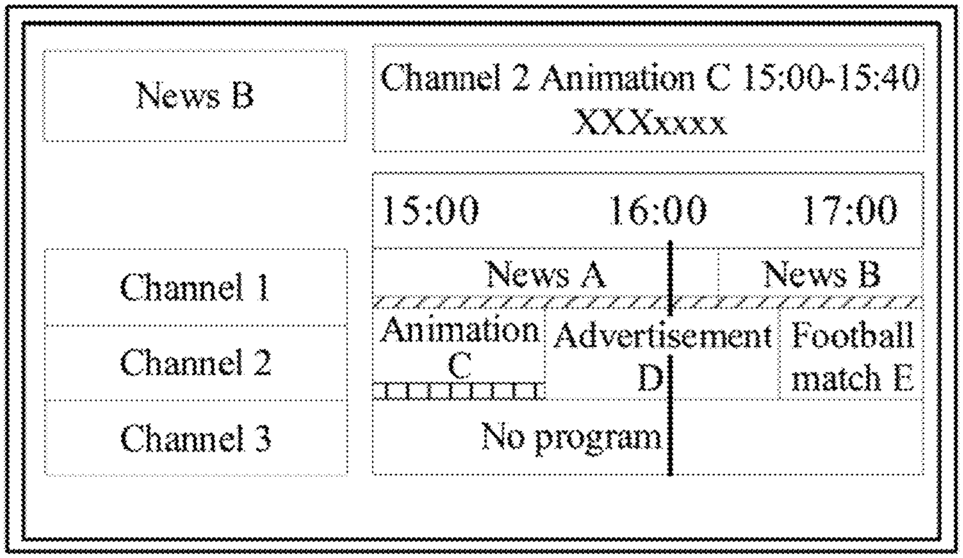
FIG. 16 shows a schematic diagram of an EPG with a part of first type of tags according to some embodiments.

With reference to example 2, taking the electronic program guide shown in FIG. 8 and the correspondence between the first program type and the first type of tag including: NEWS corresponding to the orange line, the cancel option corresponding to the red line, and CHILDREN'S corresponding to the blue line as an example. A difference from generating the electronic program guide shown in FIG. 15 is that in this example, as the red line corresponds to the cancel option, the red line is not displayed in the electronic program guide. Thus, the orange line and the blue line are shown in the electronic program guide, as shown in FIG. 16.

In some embodiments, the correspondence between the program type and the tag pre-stored in the display apparatus 200 includes: the correspondence between the second program type and the second type of tag. In these embodiments, the display apparatus 200 determines the area for program presentation corresponding to the second program type, namely, a second area for program presentation, and adds the corresponding second type of tag on the second area for program presentation.

Figure 17:
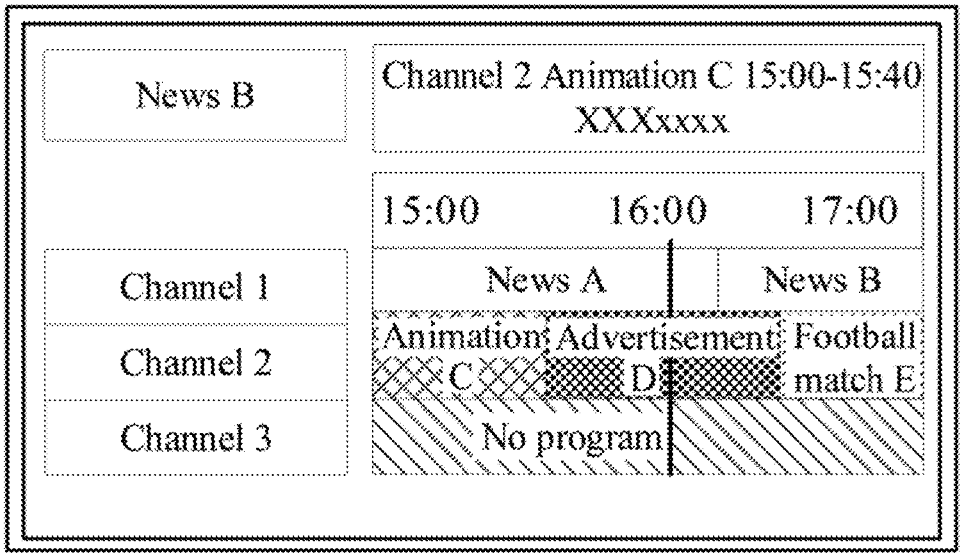
FIG. 17 shows a schematic diagram of an EPG with a second type of tag according to some embodiments.

With reference to example 3, taking the electronic program guide shown in FIG. 8, the correspondence between the second program type and the second type of tag or identifier including: the correspondences between the audio description and the second type of tag as well as between the subtitle and the second type of tag, and the second type of tag is configured to make the area for program presentation in an unavailable state in an example. The display apparatus 200 recognizes the second program type of a program in each area for program presentation, for example, the second program type corresponding to news A and news B is the sign language, the second program type corresponding to animation C is the subtitle, the program type corresponding to football match E is audio description, and advertisement D has no corresponding second program type. The display apparatus 200 makes the areas for program presentation corresponding to animation C, advertisement D, football match E and no program be in unavailable state and displays the electronic program guide shown in FIG. 17. Thus, the user may quickly find a preferred program type through the second type of tag, namely, the area for program presentation corresponding to the sign language type.

In some embodiments, the corresponding relationship between the program type and the tag pre-stored in the display apparatus 200 includes: the corresponding relationship between the first program type and the first type of tag as well as the corresponding relationship between the second program type and the second type of tag.

With reference to example 4, taking the electronic program guide shown in FIG. 8, the correspondence between the first program type and the first type of tag including: NEWS corresponding to the orange line, SPORT corresponding to the red line, and CHILDREN'S corresponding to the blue line, the correspondence between the second program type and the second type of tag including: correspondences between the audio description and the second type of tag as well as between the subtitle and the second type of tag, and the second type of tag is configured to make the area for program presentation in unavailable state in an example. The description 200 recognizes the first program type and the second program type of the program in each area for program presentation and adds the corresponding first type of tag and second type of tag to the area for program presentation. A process of recognizing the program type and adding the corresponding tag is similar to example 1 to example 3. The display apparatus 200 displays the electronic program guide shown in FIG. 18.

Figure 19:
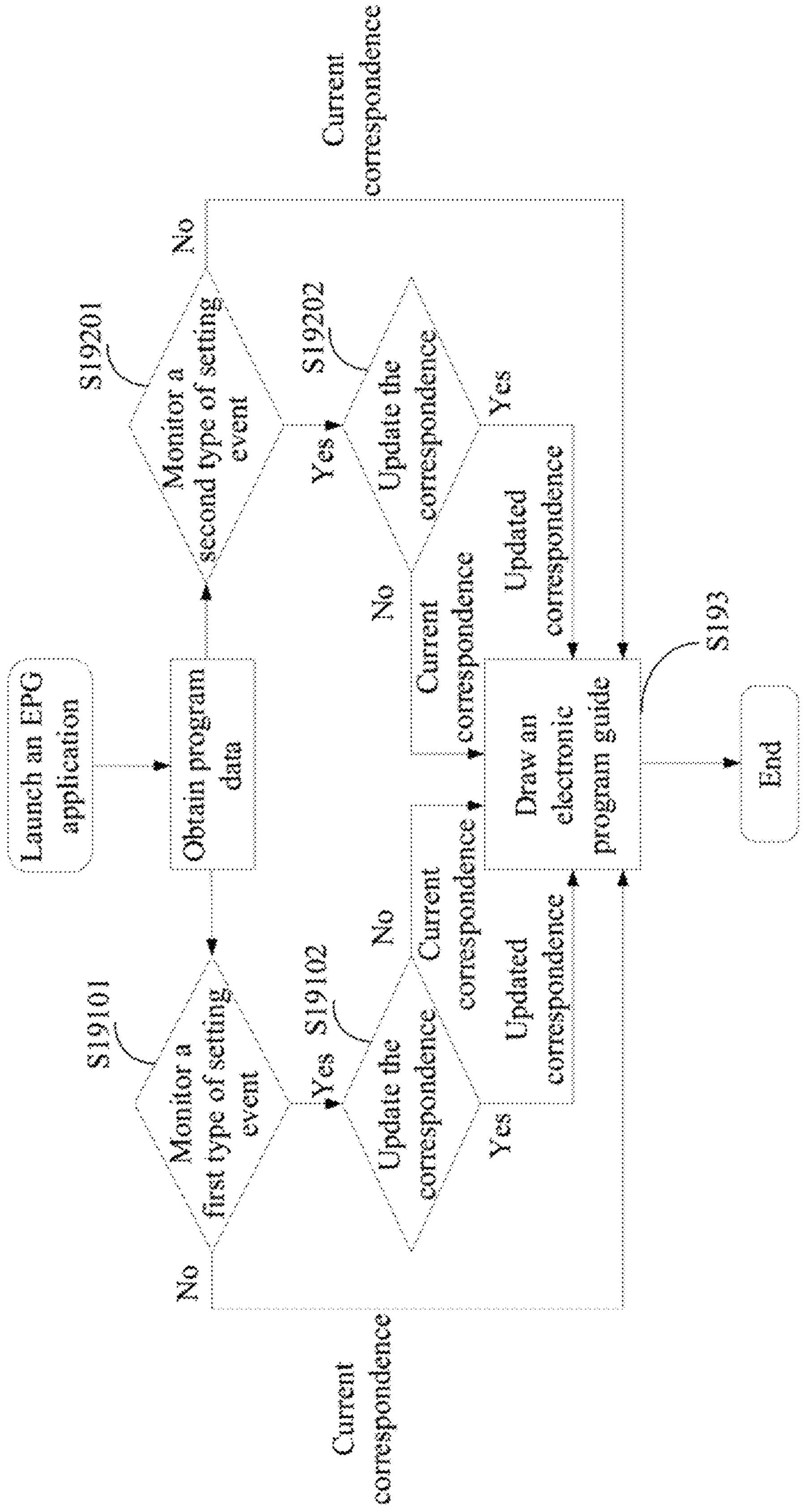
FIG. 19 shows a flowchart of changing a corresponding relationship between a program type and a tag according to some embodiments.

In some embodiments, the corresponding relationship between the program type and the tag may be changed with reference to a flow shown in FIG. 19, and the electronic program guide is updated. The display apparatus 200, after displaying the electronic program guide, monitors an event (a first type of setting event) for setting the correspondence between the first program type and the first type of tag (S19101), and monitors an event (a second type of setting event) for setting the corresponding relationship between the second program type and the second type of tag (S19201). If the display apparatus 200 detects that the first setting interface is displayed, the first type of setting event is detected. If the display apparatus 200 detects that the second setting interface is displayed, the second type of setting event is detected. The display apparatus 200, after monitoring the first type of setting event and/or the second type of setting event, changes the corresponding relationship between the first program type and the first type of tag (S19102), and/or changes the corresponding relationship between the second program type and the second type of tag (S19202). A process that the display apparatus 200 changes the corresponding relationship between the first program type and the first type of tag is similar to a process including S1101 to S1102, and a process that the display apparatus 200 changes the corresponding relationship between the second program type and the second type of tag is similar to a process including S1301 to S1302. The display apparatus 200 stops the display of the first setting interface and the second setting interface in response to an exit command from the user, and displays the corresponding tag on the area for program presentation according to the updated correspondence (S193).

Figure 18:
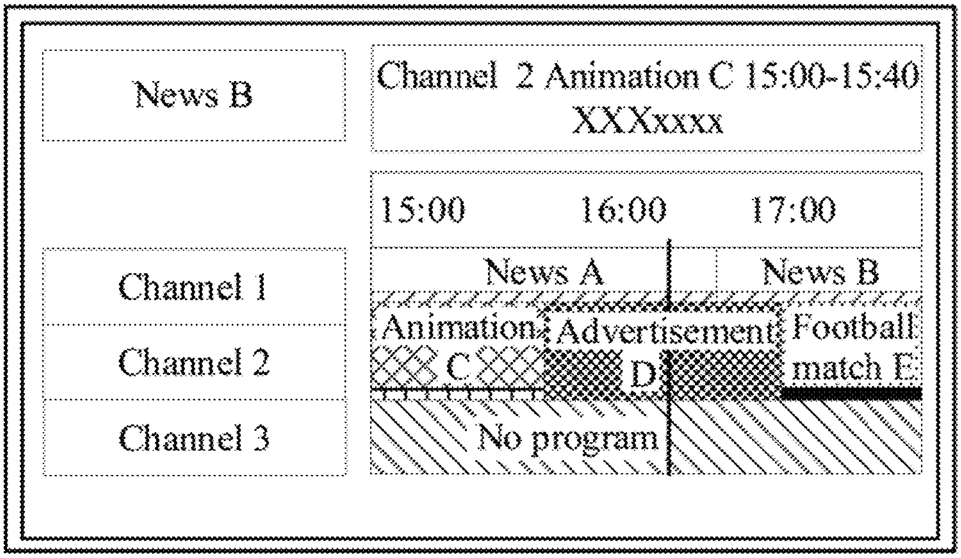
FIG. 18 shows a schematic diagram of an EPG with a first type of tag and a second type of tag according to some embodiments.
Figure 20:
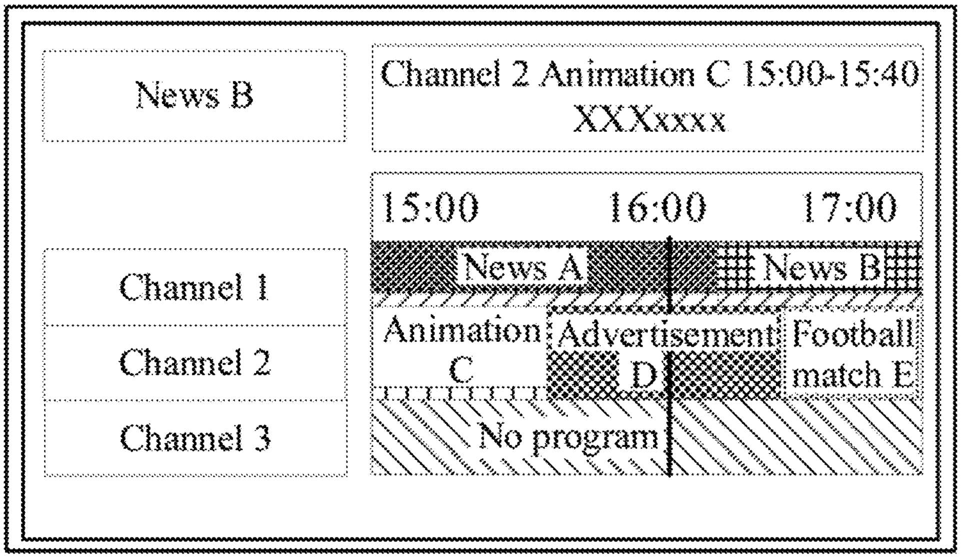
FIG. 20 shows a schematic diagram of an interface after updating an EPG according to some embodiments.

Taking the electronic program guide shown in FIG. 18 as an example. The display apparatus 200 detects that the first setting interface and the second setting interface are displayed and detects that the changed corresponding relationship between the first program type and the first type of tag includes: NEWS corresponding to the orange line. Cancel corresponding to the red line and CHILDREN'S corresponding to the blue line after detecting that the first setting interface is displayed. After detecting that the second setting interface is displayed, it is detected that the changed corresponding relationship between the second program type and the second type of tag includes: corresponding relationships between the audio description and the second type of tag as well as between the sign language and the second type of tag, and the second type of tag is configured to make the area for program presentation in unavailable state. The display apparatus 200 updates the electronic program guide according to the changed corresponding relationship and displays the updated electronic program guide as shown in FIG. 20.

Figure 21:
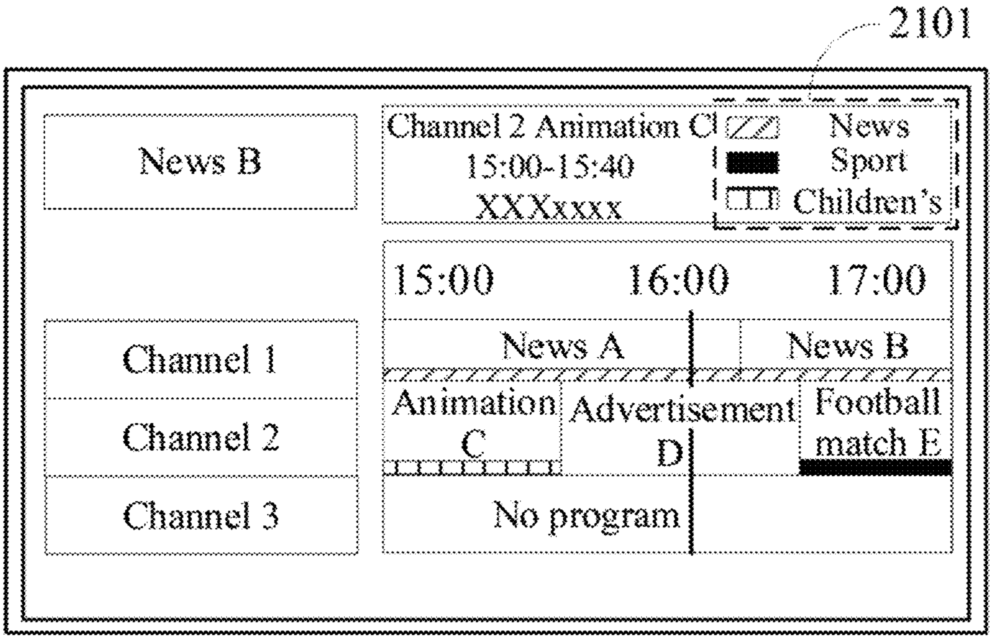
FIG. 21 shows a schematic diagram of an EPG with a shortcut information window according to some embodiments.

In some embodiments, in order to make the user accurately determine specific meanings indicated by the different tags of first type on the areas for program presentation, the first type of tags and the corresponding first program types may be displayed in the electronic program guide. Taking the electronic program guide shown in FIG. 21 as an example, the electronic program guide further includes a window 2101 for shortcut information, the first type of tag and the corresponding first program type are shown in the window 2101, the orange line corresponds to NEWS, the red line corresponds to SPORT, the blue line corresponds to CHILDREN'S, and the display apparatus 200 displays the electronic program guide as shown in FIG. 21.

Based on the above various embodiments, the display apparatus 200 may display the electronic program guide including the target presentation page (the target presentation page includes a currently played channel). In some embodiments, the display apparatus 200 may further display the electronic program guide including other presentation pages (other presentation pages do not include the currently played channel).

Figure 22:
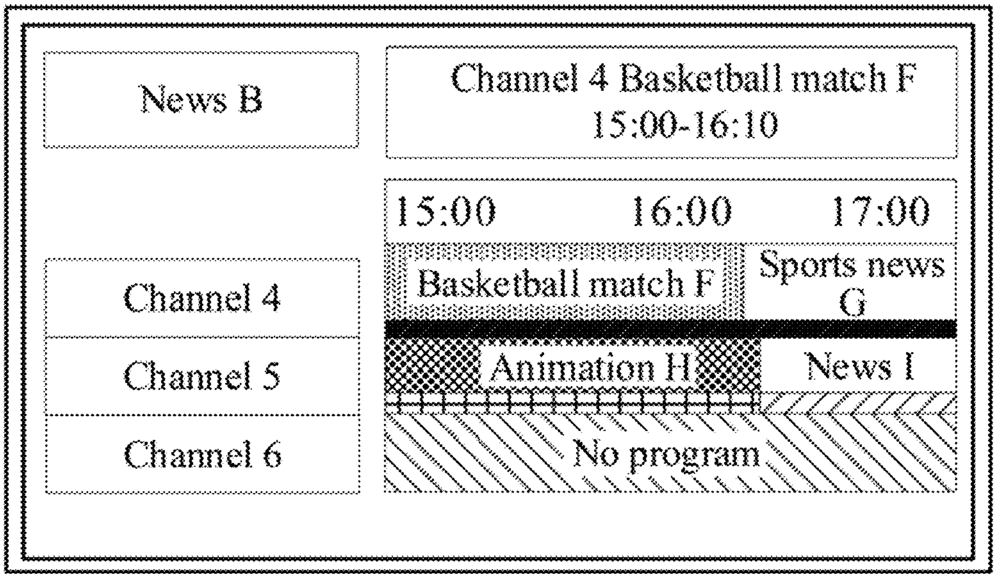
FIG. 22 shows a schematic diagram of an interface after page turning of an EPG according to some embodiments.

Taking the control device 100 being the remote control, and the electronic program guide shown in FIG. 18 as an example. The user moves the focus to an option corresponding to a last channel in the target channel list via the remote control, and inputs a page turning command to the display apparatus 200 by pressing a "down" button on the remote control, and the page turning command is used for displaying a next channel list. A first channel in the next channel list is a channel next to or after the last channel in the target channel list in the pre-stored channel list, channels in the next channel list are m channels in the pre-stored channel list starting with the first channel in the next channel list, and m is the preset number of channels for presentation. A process that the display apparatus 200 obtains one or more programs from each channel in the next channel list within the target time period is similar to S702. A process that the display apparatus 200 displays the area for program presentation with the target time period is similar to S602. A difference that the display apparatus 200 displays the electronic program guide shown in FIG. 22 and the electronic program guide shown in FIG. 18 is that the electronic program guide after page turning includes three areas for channel presentation and five areas for program presentation. The three areas for channel presentation are used for presenting Channel 4 to Channel 6 in sequence from top to bottom, the five areas for program presentation are used for presenting the program names of the programs corresponding to Channel 4 to Channel 6 within 15:00-17:00 respectively, the programs from Channel 4 include basketball match F and sports news G, the programs from Channel 5 includes animation H and news I. Channel 6 has no program within the time period, and each area for program presentation is proportional to a duration of the program. The display apparatus 200 recognizes the first program type and the second program type of each program, for example, the first program type corresponding to basketball match F and sports news G is SPORT, the first program type of the animation H is CHILDREN'S, and the first program type of the news I is NEWS. The second program type of the Basketball match F is audio description. The second program type of the sports news G and news I is sign language, and the second program type of the animation H is the subtitle. The display apparatus 200 adds the corresponding tag to each area for program presentation and displays the electronic program guide as shown in FIG. 22.

Figure 23:
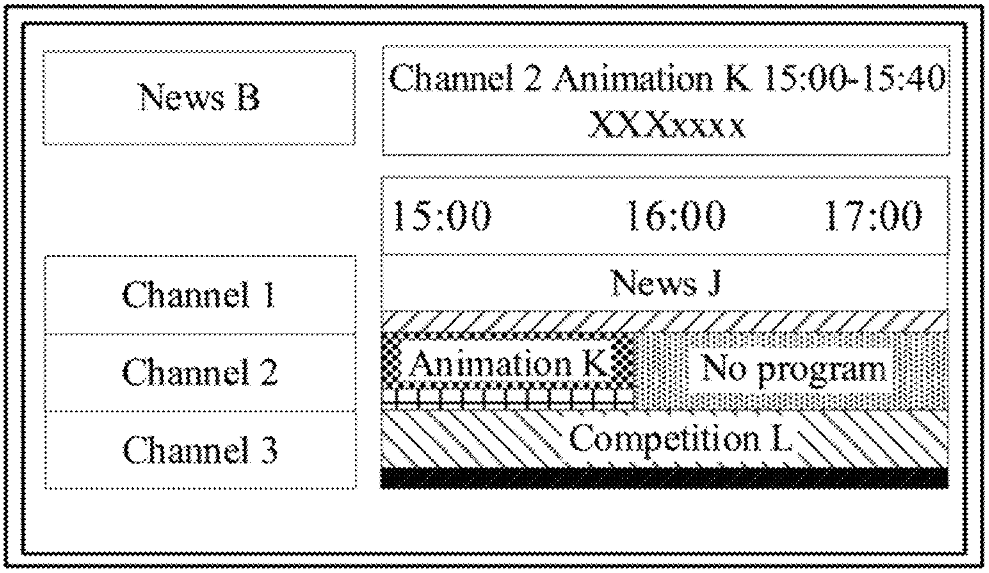
FIG. 23 shows a schematic diagram of an interface after page turning of an EPG according to some embodiments.

Taking the control device 100 being the remote control and the electronic program guide shown in FIG. 18 as an example. The user inputs a page turning command to the display apparatus 200 by pressing a specified press button on the remote control, and the page turning command is used for displaying program information of the target channel list within other time period. Exemplarily, a Yellow button on the remote control is associated with displaying program information of the target channel list within a time period the same as the target time period yesterday, and a Blue button on the remote control is associated with displaying program information of the target channel list within a time period the same as the target time period tomorrow. Taking the user inputting the page turning command into the display apparatus 200 by pressing the Blue button as an example, the display apparatus 200 obtains one or more programs of each channel in the target channel list within the time period the same as the target time period tomorrow. A process that the display apparatus 200 obtains one or more programs of each channel in the target channel list within a new time period is similar to S702. A process that the display apparatus 200 displays the area for program presentation under the new time period is similar to S602. The display apparatus 200 displays the electronic program guide as shown in FIG. 23, the three channels included in the electronic program guide after page turning are still Channel 1 to Channel 3, which differs from the electronic program guide shown in FIG. 18 that the electronic program guide includes three areas for program presentation, the three areas for program presentation are used for displaying the program names of the programs corresponding to Channel 1 to Channel 3 within 15:00-17:00 tomorrow respectively, the programs from Channel 1 includes news J, the program from Channel 2 includes animation K and no program, the program from Channel 3 includes match L, and each area for program presentation is proportional to a program duration of the corresponding program. The display apparatus 200 recognizes the first program type and the second program type of each program, for example, the first program type of news J is NEWS, the first program type of match L is SPORT, and the first program type of animation K is CHILDREN'S. The second program type of match L is audio description, the second program type of news J is sign language, and the second program type of animation K is subtitle. The display apparatus 200 adds the corresponding tag to each area for program presentation and displays the electronic program guide as shown in FIG. 23.

Figure 24:
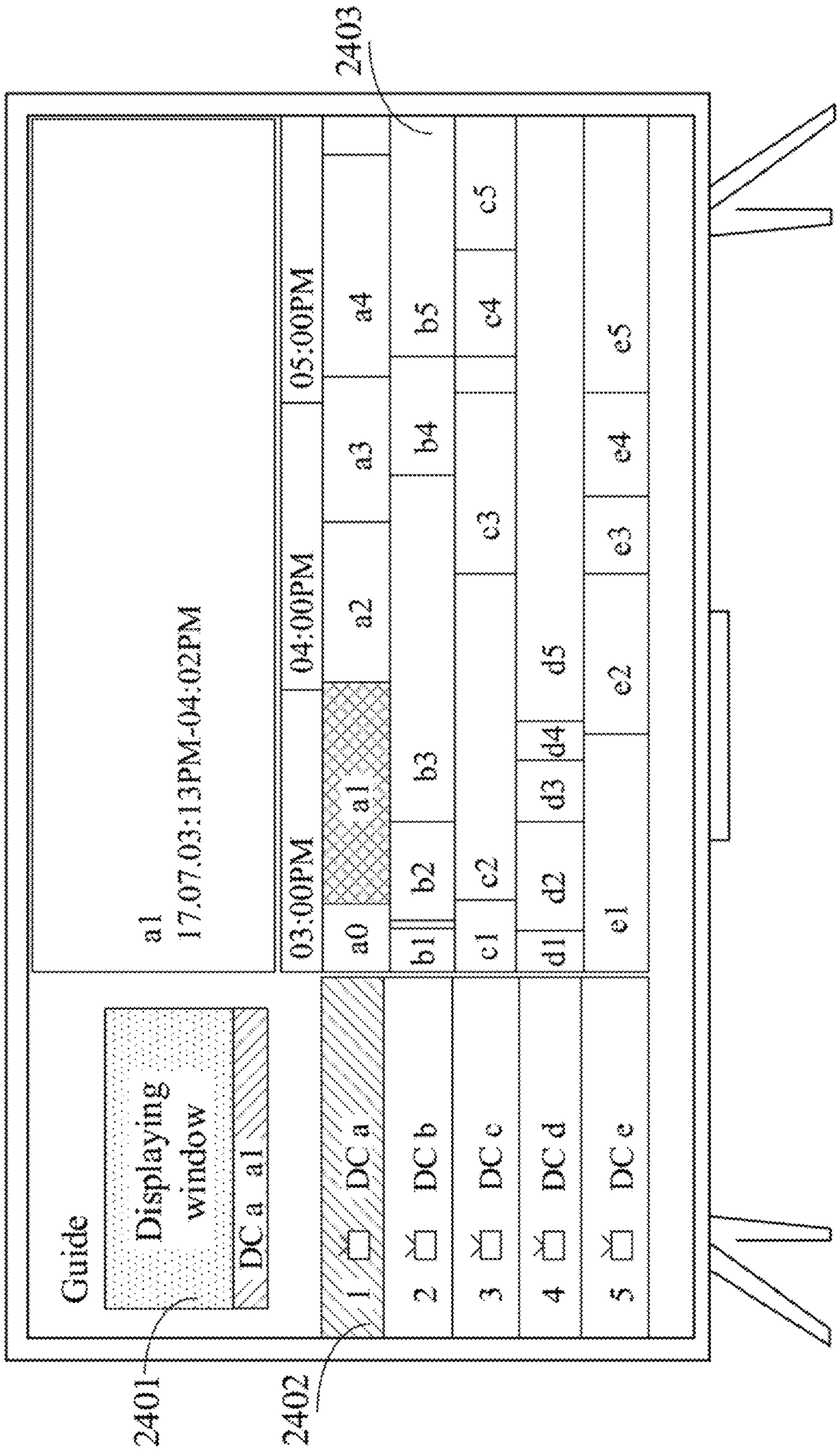
FIG. 24 shows a schematic diagram for illustrating a presentation effect of an EPG in the related art.

Based on the above display apparatus 200, a modem 210 of the display apparatus receives broadcast signals, EPG information may be extracted from the broadcast signal via a decoder, the extracted electronic program guide information is outputted to an internal bus, so that at least one processor 250 stores the electronic program guide information in the memory, to allow the electronic program guide to be displayed on the user interface of the display apparatus later. FIG. 24 shows a schematic diagram of a display effect of an electronic program guide in the related art according to some embodiments. As shown in FIG. 24, at present, the display apparatus 200 usually displays the electronic program guide on a display interface, including a guide area 2401, an area for channel list 2402 and an area for program list 2403, and a media resource selected by the user needs to be scaled down and displayed in the small window of the guide area 2401.

Some embodiments of the disclosure further provide a display apparatus and a method for displaying an electronic program guide. In some embodiments, the display apparatus 200 includes a display 260 and at least one processor 250, and the at least one processor 250 is configured to execute a process for displaying the electronic program guide. The process for displaying the electronic program guide provided by some embodiments of the disclosure is discussed below with reference to the accompanying drawings.

Figure 25:
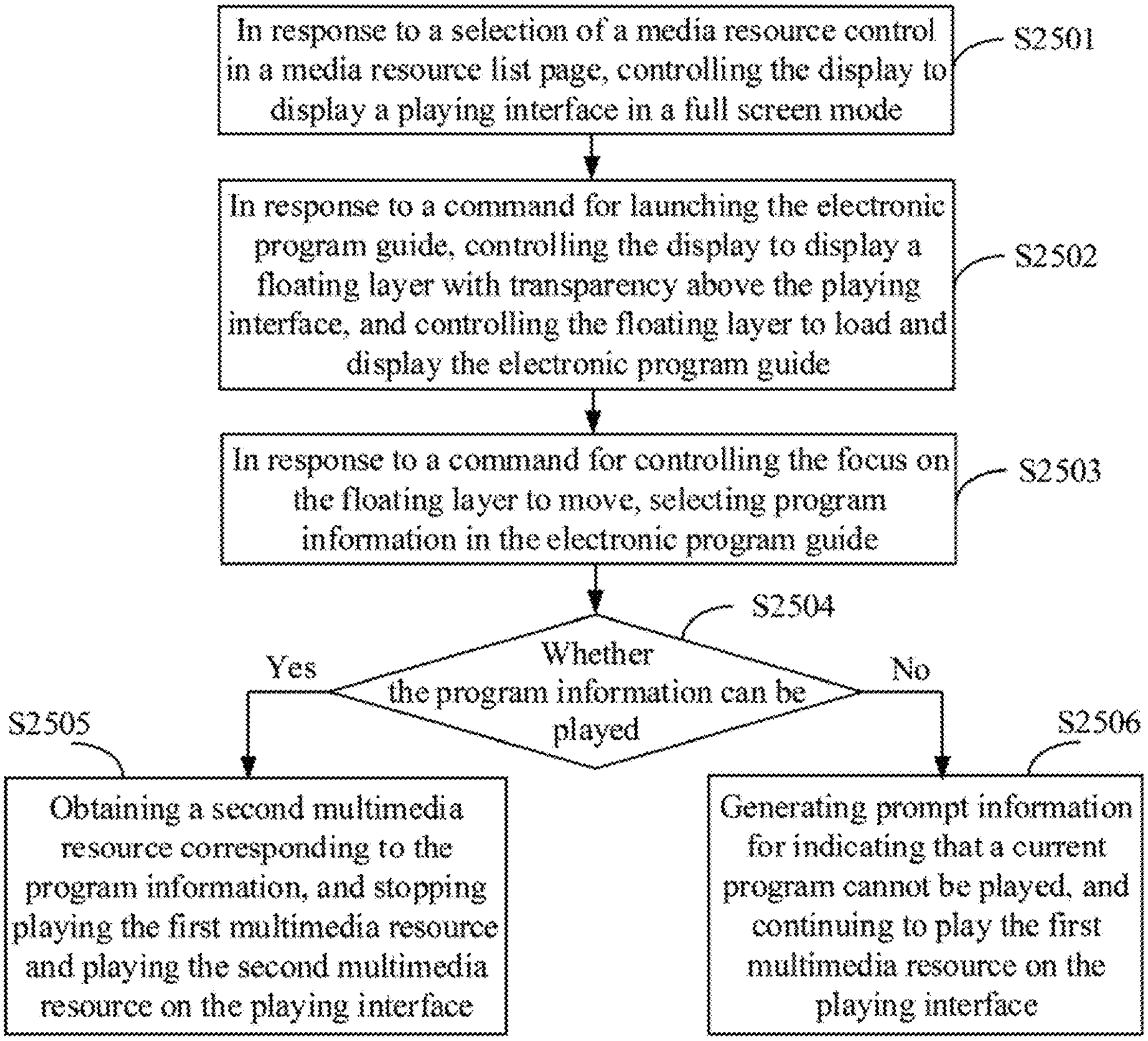
FIG. 25 shows a flowchart of a display method of an EPG according to some embodiments.

FIG. 25 shows a schematic flowchart of a method for displaying an electronic program guide according to some embodiments. With reference to FIG. 25, the process for displaying the electronic program guide is as follows.

S2501: in response to a selection of a media resource control in a media resource list page, controlling the display to display a playing interface in a full screen mode.

In some embodiments, the display apparatus 200 displays the media resource list page on the user interface, and may recommend multimedia resource for the user in the media resource list page by providing one or more media resource controls. When browsing the media resource list page, the user may select a media resource control through a control device 100, and the display apparatus 200 sends a media resource request to a server 400 in response to a selection from the user, so as to make the server 400 feed back a related first multimedia resource. The display apparatus 200, after receiving the first multimedia resource, controls the display 260 to display the playing interface in a full screen mode, and displays the first multimedia resource corresponding to the media resource control through the playing interface, namely, the first multimedia resource is played in a full screen mode.

S2502: in response to a command for launching the electronic program guide, controlling the display to display a floating layer with transparency above the playing interface, and controlling the floating layer to load and display the electronic program guide.

In some embodiments, continuing to refer to FIG. 13B, taking HTML5 APP as an example, an application interface is drawn through an html element, and video playing is performed through an html video element.

Setting of lamination of application interfaces is performed through a CSS z-index property of the html element. A level of a video label is set (such as z-index:0) to be lower than an EPG interface (such as z-index:100), so that the EPG interface can float on the playing interface. Opacity of the EPG interface is set to be semi-opaque (such as opacity:0.7) by setting the element CSS opacity property.

In this way, the EPG interface may be displayed in a form of a semi-opaque floating layer, and a media resource content under playing may still be viewed while the EPG interface is displayed.

When a GUIDE button is pressed, a command associated with the button is distributed and forwarded and the command is finally transmitted to the EPG application for process.

The EPG application, after receiving the command, reads channel data and program data from a database. The data are transmitted to the EPG application, including a Channel list and a Program list.

Each piece of data in a data list is traversed by using a for cycle, and the data fill the corresponding html element for interface rendering. A VUE framework is selected during rendering.

In some embodiments, the user may send a command for launching the electronic program guide via pressing a particular button on the remote control, such as an EPG button or the menu button. Or, the user may also send a command for launching the electronic program guide via voice control, for example, after the user inputs a wake-up word "Hi! XX", a voice command for "opening an electronic program guide" is inputted into the display apparatus 200.

Figure 26:
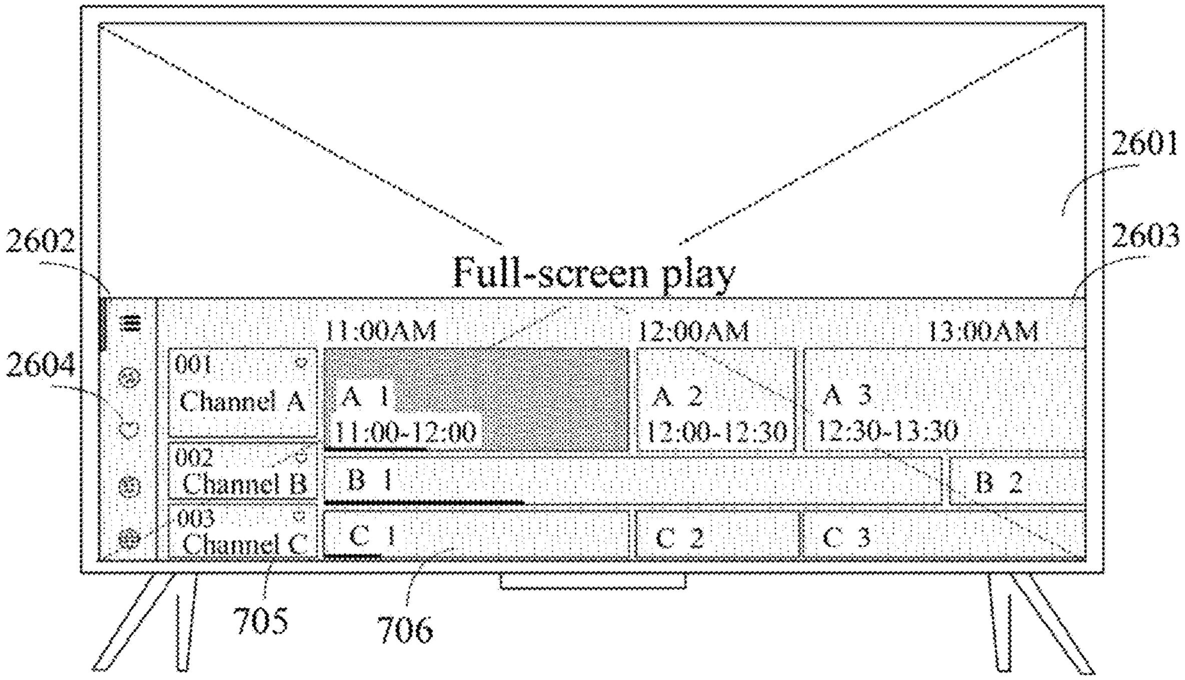
FIG. 26 shows a schematic diagram for illustrating a presentation effect of an EPG on a display apparatus 200 according to some embodiments.

In some embodiments, the at least one processor 250 reads the electronic program guide information pre-stored according to the broadcast signal, constructs the electronic program guide and controls the display 260 to display the floating layer above the currently played interface, and the electronic program guide is loaded and displayed on the floating layer. FIG. 26 shows a schematic diagram of a display effect of an electronic program guide in a display apparatus 200 according to some embodiments. As shown in FIG. 26, the display displays the playing interface 2601 in a full screen mode, and the floating layer is displayed above the playing interface 2601 in a half screen mode.

In some embodiments, the application interface is drawn through the html element, video playing is performed through the html video element, specifically, the playing interface and a first floating layer may be set as different levels of document object modes (DOMs), and after the user clicks the media resource control to play, the display apparatus 200 displays the playing interface on the display 260 according to a bottom-layer DOM tree and calls the first multimedia resource to be displayed on the playing interface. When the user launches the electronic program guide, the display apparatus 200 displays the floating layer above the playing interface according to the bottom-layer DOM tree and calls the electronic program guide information to be displayed on the floating layer.

In some embodiments, a DOM layer includes an option of visible or invisible, when the electronic program guide does not need to be displayed, that is, the floating layer needs to be concealed, the DOM layer corresponding to the floating layer may be set to be in an invisible state, and when the electronic program guide needs to be displayed, that is, the floating layer needs to be displayed, the DOM layer corresponding to the floating layer may be set to be in a visible state.

In some embodiments, the DOM layer contains an opacity set option, and by setting opacity of the DOM layer corresponding to the floating layer, the floating layer does not completely cover the playing interface.

Referring to FIG. 26, in some embodiments, the floating layer includes a first display area 2602 and a second display area 2603.

The display apparatus 200 controls the first display area 2602 to display the channel classification list, the channel classification list is used for displaying different types of the channels in a classified mode through different type controls 2604, such as a movie control, a favorite control and a kid control.

The display apparatus 200 controls the second display area 2603 to display the channel list and the program list, the channel list is used for presenting different channels via different channel controls 2605, and the program list includes program information in each channel in different playing time periods in form of the different program controls 2606. When the display apparatus stores the electronic program guide information, channel information therein may be stored with the corresponding channel identifiers simultaneously, that is, each channel is marked with the channel tag. The channels with the same channel tag belong to the same type in the channel classification list, for example, the channels playing a movie type of program are labeled with DY, and after the user selects a type control for representing movie in the channel classification list, the display apparatus 200 obtains the channels with the DY tag and displays the channels in the second display area 2603. Correspondingly, the display apparatus 200 obtains program information in the channels with the DY tag and synchronously displays the program information in the second display area 2603, as shown in FIG. 26, program A1 to program A3 are included under channel A, program B1 to program B2 are included under channel B, and program C1 to program C3 are included under channel C. Certainly, if the user selects a type control for representing all the channels in the channel classification list, the display apparatus 200 obtains all the channels and displays the channels in the second display area 2603.

In some embodiments, the longer a playing duration of the second multimedia resource corresponding to program information is, the larger a length of the corresponding program control is. As shown in FIG. 26, program controls under the channel A, the channel B and the channel C are uneven in length, as for the program A2, the playing duration of the corresponding second multimedia resource is half hour, the playing duration of the corresponding second multimedia resource of the program A3 is an hour, and a length of the program control of the program A2 is smaller than a length of the program control of the program A3.

In some embodiments, when the user controls the focus to move to a first type control in the channel classification list, the display apparatus 200 obtains channels labeled with the channel tag corresponding to the first type control and generates a channel list, and displays the channel list in the second display area 2603. The display apparatus 200, when storing the electronic program guide information, can pregenerate a mapping relationship between each channel and program information in the channel according to each channel and the program information corresponding to each channel, and after the channel list is displayed in the second display area 2603, the display apparatus 200 obtains the corresponding program information to display, specifically, the channel controls and the corresponding program controls are controlled to be displayed in row. As shown in FIG. 26, the channel A and the corresponding program A1 to program A3 are displayed in the same row, the channel B and the program B1 to program B2 are displayed in the same row, and the channel C and the program C1 to program C3 are displayed in the same row.

In some embodiments, when the focus lands in the channel list, the user may select a channel in the channel list that the user intends to watch by pressing an up/down button on the remote control. The display apparatus 200 displays a channel control with the focus and the corresponding program information in a first row in the second display area in response to a command from the user, and a height of the first row in the second display area is greater than heights of the rest of rows in the second display area. As shown in FIG. 26, a row where the channel A is located is a row where the focus lands or a row with the focus, and a row height of the row where the channel A is located is obviously larger than row heights of rows where the channel B and the channel C are located, so as to guarantee that the user may view more information.

For example, as shown in FIG. 26, the row where the focus lands is the row where the channel A is located. When the user presses a down button on the remote control, the display apparatus 200 controls the row where the channel B is located to move up as a whole, a height is increased, and the row where the channel B is located becomes the row where the focus lands. An actual duration of the first program B1 in the channel B is long, and the program control is large in length correspondingly, so it needs to be adjusted to a standard size adaptively.

In some embodiments, in the program list, a fixed-focus position is set as the first one in a first row via a fixed-focus mode. As shown in FIG. 26, in an area (the program list) where the program A1 to the program A3, the program B1 to the program B2 and the program C1 to the program C3 are located, the fixed-focus position locates in the first one in the first row via a fixed-focus mode all the time. When the focus is in the program list, the program control in the fixed-focus position is set to be in a standard size, for example, the standard size may be set as a size of the program control corresponding to one-hour playing duration. When the focus moves out of the program list, the program control previously directly in the fixed-focus position is set to be an actual size. For example, as shown in FIG. 26, the current focus lands on the program control where the program A1 is located, in this case, the user presses a right direction button on the remote control, the program control where the program A2 is located needs to move to the first one in the first row in the program list, a duration of the program A2 is half hour, and the program control where the program A2 is located needs to be adjusted as a standard size. Then, if the user moves the focus out of the program list via the remote control, the program control (the first one in the first row in the program list) where the program A2 is located needs to be restored to the actual size, that is, a length corresponding to the half hour.

Figure 27:
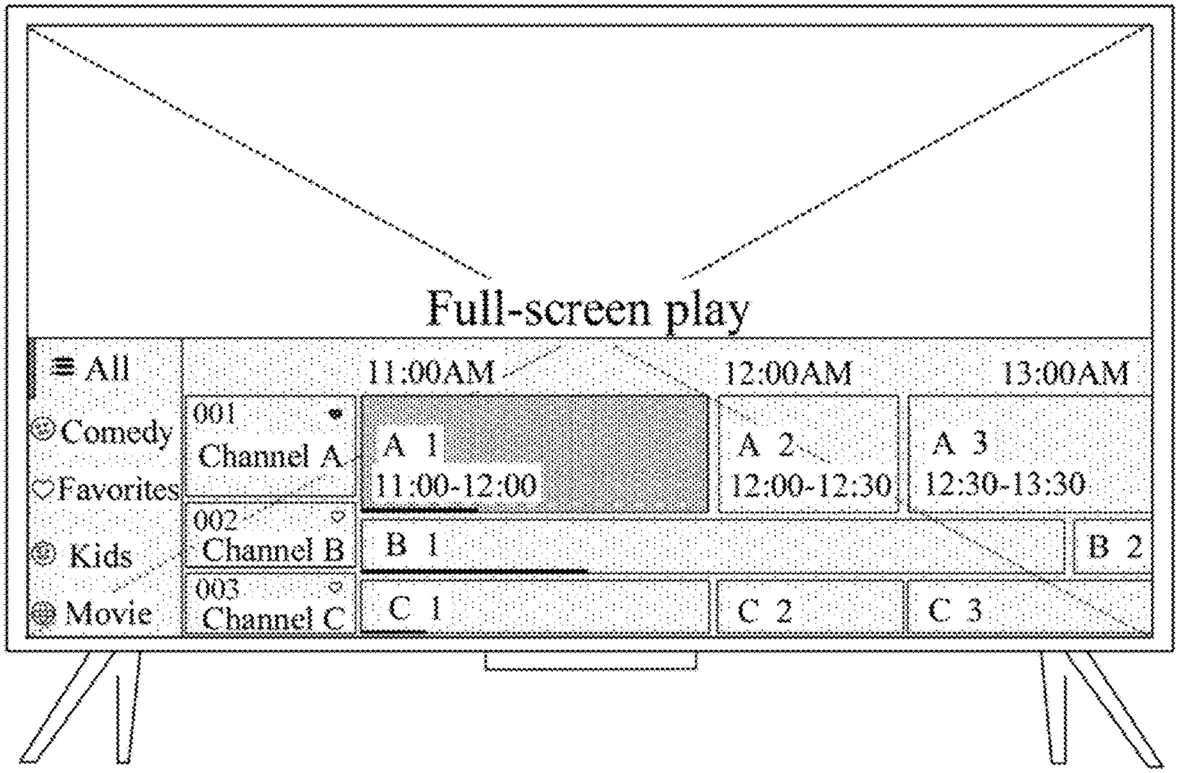
FIG. 27 shows another schematic diagram for illustrating a presentation effect of an EPG on a display apparatus 200 according to some embodiments.

FIG. 27 shows a schematic diagram of a display effect of an electronic program guide of a display apparatus 200 according to some embodiments. As shown in FIG. 27, when the focus moves to the channel classification list, the first display area 2602 is widened, so the first display area shows the type control 2604 and corresponding classification information, and the classification information here refers to "All, Comedy, Favorites, Kids, Movie" shown in FIG. 27. Referring to FIG. 26 again, when the focus moves out of the channel classification list, a size of the first display area is restored, so that the first display area shows merely the type controls to provide more display space for program information on a right side.

Figure 28:
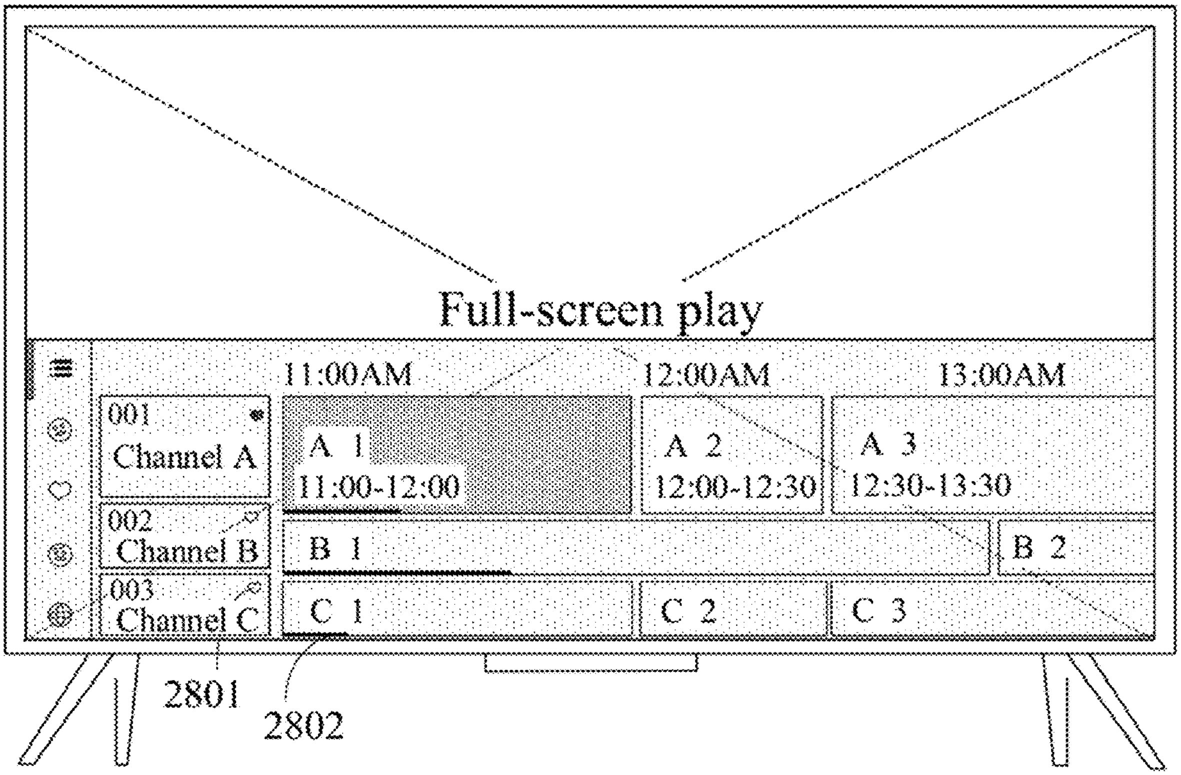
FIG. 28 shows another schematic diagram for illustrating a presentation effect of an EPG on a display apparatus 200 according to some embodiments.

FIG. 28 shows a schematic diagram of a display effect of an electronic program guide of a display apparatus 200 according to some embodiments. Referring to FIG. 28, when the channel control is shown in the channel list in the second display area, a sub-control 2801 for indicating favorite is further displayed on the channel control, and if the user usually prefers a certain channel, the user may collect the channel into a favorite type of channels by selecting the sub-control for indicating favorite on the channel control. Besides, when the program control is displayed in the program list of the second display area, for a program currently being playing, the display apparatus controls to display a progress bar 2802 on the corresponding program control.

S2503: in response to a command for controlling the focus on the floating layer to move, selecting program information in the electronic program guide.

S2504: determining whether the program information can be played.

In some embodiments, when the user selects a piece of program information by a direction button on the remote control, the display apparatus 200, when receiving a selection of the corresponding program control from the user, needs to check whether the program is within playing time, if yes, it is determined that the program can be played, and if not, it is determined that the program cannot be played. In general, the program that can be played is usually a live broadcast program, or a program already played, and the program that cannot be played is usually a program which is not scheduled to start.

S2505: obtaining a second multimedia resource corresponding to the program information, and stopping playing the first multimedia resource and playing the second multimedia resource on the playing interface.

In some embodiments, when the program corresponding to selected program information can be played, the display apparatus 200 sends to the server 400 a media resource request for the program, so as to make the server 400 feed back the second multimedia resource of the program. The display apparatus 200, upon receiving the second multimedia resource, controls to stop playing the first multimedia resource and play the second multimedia resource, and the playing interface of the first multimedia resource switches to the playing interface of the second multimedia resource.

S2506: generating prompt information for indicating that a current program cannot be played, and continuing to play the first multimedia resource on the playing interface.

In some embodiments, when the program corresponding to the selected program information cannot be played, the display apparatus 200 generates the prompt information for indicating that the current program cannot be played, for example, the current program control is set to jitter based on a CSS property, or displays a prompt box of "a current program cannot be played", or the like, so as to prompt the user that the current selected content cannot be played. Meanwhile, the first multimedia resource continues to be played.

Figure 29:
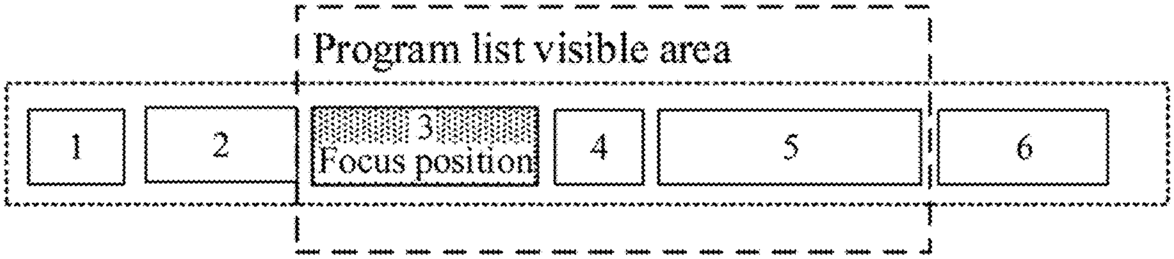
FIG. 29 shows a schematic diagram for illustrating a rendering effect of a program list according to some embodiments.

In the disclosure, a fixed-focus mode is adopted at the program list, that is, the focus position keeps the same size all the time, and in the related art, a position of each control in the list needs to be calculated every time the focus moves. FIG. 29 shows a schematic diagram of a rendering effect of a program list according to some embodiments. Referring to FIG. 29, taking program information from one channel as an example, the display apparatus 200 renders the whole program list firstly, that is, program controls 1 to 10 are rendered as a transverse list, and the focus lands on the program control 3.

In some embodiments, the program list is stored as an array in the memory, during rendering, data traversing is performed on the array by using for cycle, each piece of traversed data fills in a corresponding html component, and the list is completed.

A program (the program 3) currently being played and a program next to or following program 3 are determined according to the current time and time information in the program data. The current program (the program 3) is set to have a required fixed width based on a width property. A control of the program 3 is set to be in the leftmost of a visible area based on a css left property. A position of the subsequent program is a width of a previous program plus a gap between the programs. Thus, pieces of program information are rendered to be a transverse list.

Elements outside the program list visible area are concealed, that is, the program controls 1, 2 and 6 are concealed. A size of the focus position (program 3) is fixed all the time, so a position of each program control in the list relative to the program control 1 may update every time the focus moves. A size and a position of the program control need to be adjusted every time the focus moves right and left.

For example, the size of the focus position is fixed as 20 rem, and the program 3 is a focus program currently.

When the focus moves right, the control of program 3 is restored from the fixed size (20 rem) to an actual size (calculated according to a program duration, such as 23 rem), the whole list is moved leftwards, and a moving distance is the actual size (23 rem) of the program 3.

In this case, the program 4 will be located on a leftmost side of the visible area, and the control of the program 4 is adjusted from the actual size (such as 14 rem) to the fixed size (20 rem). A distance between the program after the program 4 from a left side is adjusted in sequence to complete movement of the list.

It may be seen that program data of many programs need to be adjusted in one-time movement. A position of each element in the whole list needs to be calculated again.

For example, when there are 30 programs in the list, a position relationship among the 30 programs needs to be calculated every time the focus moves.

Figure 30:
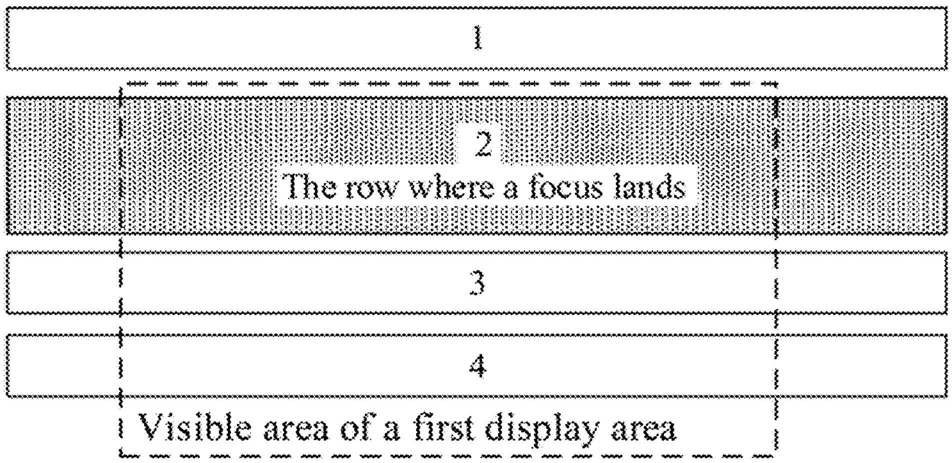
FIG. 30 shows a schematic diagram for illustrating a rendering effect for display content in a first display area according to some embodiments.

FIG. 30 shows a schematic diagram of a rendering effect of a display content in a first display area according to some embodiments. Referring to FIG. 30, the transverse list formed by each row of program information shown in FIG. 29 is combined to form a longitudinal list, and as a height of the whole electronic program guide is fixed, and a height of the floating layer is also fixed, at most three rows may be shown on the floating layer. When the focus moves up and down, the whole list moves, a height of the row where the focus is located is fixed and larger than those of other rows, so during up-down movement, a position of each row relative to the row where the focus is located may also change, which leads to data recalculation.

Figure 31:
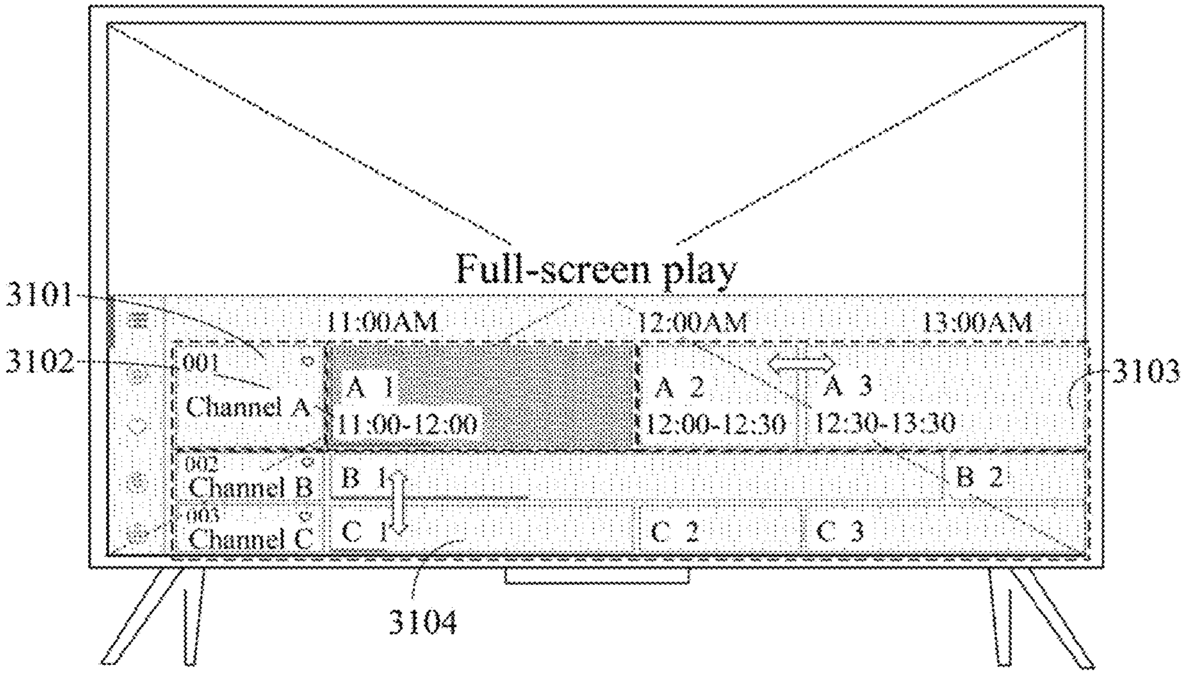
FIG. 31 shows another schematic diagram for illustrating a presentation effect of an EPG on a display apparatus 200 according to some embodiments.
Figure 32:
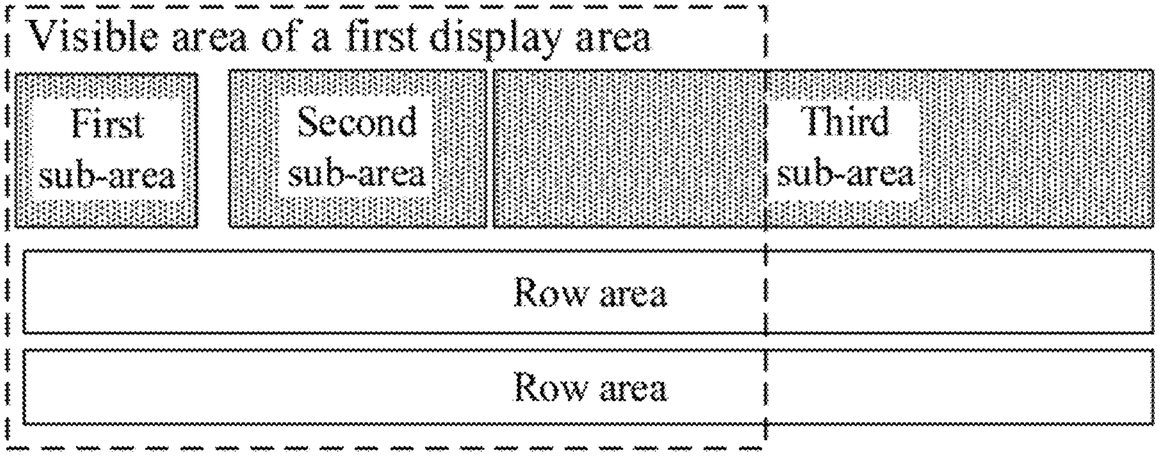
FIG. 32 shows another schematic diagram for illustrating a rendering effect of display content in a first display area according to some embodiments.

FIG. 31 shows a schematic diagram of a display effect of another electronic program guide of a display apparatus 200 according to some embodiments. FIG. 32 shows a schematic diagram of another rendering effect of a display content in a first display area according to some embodiments. Referring to FIG. 31 and FIG. 32, in some embodiments, in a first row of the second display area, an area where the channel control is located is set as a first sub-area 3101, an area where a first program control is located is set as a second sub-area 3102 and an area where the rest of program controls are located is set as a third sub-area 3103, and an area for the rest of rows except for the first row in the second display area are arranged to be an area for several rows 3104. The first sub-area 3101, the second sub-area 3102, the third sub-area 3103 and the area for several rows 3104 are sub-areas independent of one another.

In some embodiments, in the first row of the program list, the display apparatus 200: in response to a command for indicating a right move or a left move, updates data in the second sub-area 3102 to program information corresponding to a program control where the focus lands during movement, and controls a program control in the third sub-area 3103 to move in a direction opposite to the right move or the left move. In the channel list, the display apparatus 200: in response to the command for indicating an upwards move or a downwards move, updates data in the first sub-area 3101 to a channel corresponding to a channel control where the focus lands during movement, updates data in the second sub-area 3102 to program information indicated by a first program control corresponding to the channel control in the first sub-area 3101, updates data in the third sub-area 3103 to program information indicated by a program control except for the first program control in the first sub-area 3101, and updates the channel controls in the area for several rows 3104 and the corresponding program controls.

In other words, the control with the fixed size and position is set as an independent area, based on different properties of all the controls in the electronic program guide.

In embodiments of the disclosure, different areas are distinguished through an interactive design of the EPG interface.

The controls are interface objects drawn by using html elements.

A data format is saved as a JS object in the memory, and the content is information needed for program display and program search. For example:

Width
Height
Id: unique id of a program
channelId: a channel id corresponding to the program
title: a title of the program
description: a description for the program
startTime: start time of the program
endTime: end time of the program For example, the first sub-area 3101, the second sub-area 3102 and the third sub-area 3103, merely two fixed-size controls need to fill in the first sub-area 3101 and the second sub-area 3102, and when the focus moves right and left, it merely needs to monitor the corresponding data independently for drawing.

The EPG application uses the VUE framework, and a core function of the framework is two-way binding of data. When data for rendering change, it may be automatically reflected onto the interface.

A core principle of data monitor is Object.defineProperty (a Proxy property) provided by JavaScript (js) native version. The js property allows hijacking of js data. When the data change, a using party hijacks the data change for performing a corresponding action.

That is, data to be displayed in the first sub-area 3101 and the second sub-area 3102 merely needed to be processed (the second sub-area 3102 is updated to data in a program control of the third sub-area 3103).

The second sub-area (namely, the focus position) here includes one time change of element data, but the position does not change all the time, which does not involve position recalculation and is low in rendering cost.

Correspondingly, in the third sub-area 3103, a focus obtaining process is not involved, so adjustment of a size of the program control is not needed, a distance from the leftmost side does not change, thus, during right-left movement, merely regular translation or lateral move is performed (a position of the program control in the third sub-area 3103 is translated leftwards/rightwards by one element).

The above regular translation is a scheme used during movement of the third sub-area and is a part of an interface operation scheme of the disclosure. As for regular item translation for a list, after rendering of the list is completed, the list is used as a whole, and there is no relative position change among the elements in the list. When the list moves, the list needs to be moved in whole merely based on a ess native transform property instead of changing each program element, and good performance is achieved. Lateral move is performed by using translateX, and vertical move is performed by using translate Y.

The regular translation or lateral move is only to change an element position. Merely one control needs to be recalculated, and calculation cost is reduced.

Likewise, as for the area for several rows 3104, the area for several rows 3104 is separated from the first row in the second display area and is a relative independent area. When the focus moves up and down, the display apparatus obtains a previous row/a next row in the channel list, the first sub-area 3101 is updated with a new channel, the second sub-area 3102 is updated with the first one ranked first in program(s) from the new channel, and the third sub-area 3103 is updated with other data in the program(s) from the new channel except for the first one. Meanwhile, data of channels and programs below the new channel are calculated and updated, and filled into the area for several rows 3104.

Through the display apparatus in the disclosure, the electronic program guide may be displayed on the playing interface presented in a full screen mode via the floating layer with transparency, so that the user can display the electronic program guide while playing the media resource in a full screen mode, and user experience is improved. Specifically, by dividing into a plurality of sub-areas, while interface rendering is implemented, there is no increased number of html elements to be drawn, that is, the number of controls is not increased. Meanwhile, the number of controls to be recalculated is reduced. When the focus moves, processing of dozens of controls is reduced to processing of merely two controls which includes one time element change (the second sub-area) and regular translation (the third sub-area). Accordingly, in a process of implementing data loading and rendering, the number of the controls is not increased, the number of controls for recalculation during focus move is reduced greatly, and processing performance is improved.

In some embodiments of the disclosure, a method for displaying an electronic program guide is further provided. The method includes: in response to a selection of a media resource control in a media resource list page, causing the display to display a playing interface in a full screen mode, the playing interface is used for displaying a first multimedia resource corresponding to the media resource control; in response to a command for launching the electronic program guide, causing the display to display a floating layer with transparency above the playing interface and controlling the floating layer to load and display the electronic program guide; in response to a command for move a focus to a program item on the floating layer, selecting program information associated with the program item in the electronic program guide. The display apparatus obtains a second multimedia resource corresponding to the program information in response to the selected program information being within a current playing time, and switches the playing interface of the first multimedia resource to the playing interface of the second multimedia resource. The display apparatus generates prompt information for indicating that a current program cannot be played in response to the selected program information being not within the current playing time, and controls the playing interface to continue playing the first multimedia resource.

In some embodiments, the floating layer includes a first display area and a second display area. The method further includes: the display apparatus controls the first display area to display a channel classification list, the channel classification list includes different types of channels in a classified mode in form of different type controls. The display apparatus 200 controls the second display area to display a channel list and a program list, the channel list is used for displaying different channels in form of different channel controls, each channel is labeled with a channel tag, and channels with the same channel tag belong to the same type in the channel classification list; the program list is used for displaying program information in each channel in different playing time periods in form of different program controls; and the longer a playing duration of the second multimedia resource is, the larger a length of the corresponding program control is.

The invention claimed is:

1. A display apparatus, comprising:

a display configured to display an image from broadcast system or Internet, and/or display a user interface;

a communicating device, configured to communicate with the network;

a remote control, comprising a plurality of buttons;

a memory, configured to store instructions and data associated with the display; and at least one processor, in connection with the display, the communicating device and the memory and configured to execute the instructions to cause the display apparatus to perform:

in response to a command for displaying an electronic program guide from a user, obtaining a set of target channels, a target time period and one or more programs in the set of target channels within the target time period from a server in communication with the display apparatus, wherein the set of target channels comprises all channels presented in a target presentation page, and the target time period is a time period for presentation in the target presentation page; and controlling the display to display the electronic program guide comprising the target presentation page on a user interface, wherein the target presentation page comprises a plurality of areas for channel presentation and a plurality of areas for program presentation, the area for channel presentation is used for presenting a channel name, the area for program presentation is used for presenting one or more program names of the one or more programs, a length of a first area for presentation of a first program is proportional to a program duration of the first program, the first area for presentation of the first program shows a program name of the first program and a visual tag for indicating a program type of the first program;

wherein the program type comprises a first program type for a program which is determined based on content of the program and a second program type for the program which is determined based on function data carried in the content of the program;

the first program type is determined according to genre data in program source signals, and the genre data comprises one or more of: Movie, News, Entertainment, Shows, Music, Sport, Children's, Education, Lifestyle, Drama, Unclassified, Social, or Series;

the function data comprises one or more of Subtitle, Audio Description, or Sign Language;

the visual tag comprises tags of a first type and a tag of a second type;

one of the tags of the first type indicates one genre of the first program type of the program, different tags of the first type indicate different genres of the first program type, and the tags of the first type comprise patterns of the area for program presentation;

the electronic program guide further shows a window for shortcut information, wherein the window for shortcut information locates at one of sides of the target presentation page and shows a mapping list comprising the tags of the first type and names of the first program type corresponding to the tags of first type; and the tag of the second type indicates the second program type of the program, and the tag of the second type is used for adjusting a display state of the first area for presentation of the first program, and the tag of second type is implemented by: reducing opacity of the first area for presentation of the first program, and/or making the first area for presentation of the first program in unavailable state;

in response to a command for displaying a setting interface from the user, causing the display to show the setting interface that is used for setting a correspondence between program types and visual tags, wherein causing the display to show the setting interface comprises:

in response to a command input by the user via a first button of a control device, causing the display to show a first setting interface, wherein the first setting interface is used for the user to select a first program type added with a tag of the first type, the first setting interface shows cancel options corresponding to the tags of the first type, and each cancel option is used to indicate not to display a corresponding tag of the first type in the electronic program guide; and in response to a command input by the user via a second button of the control device, causing the display to show a second setting interface, wherein the second setting interface is used to select a second program type not added with the tag of the second type;

in response to a setting command from the user, establishing a correspondence between one genre of the program types and one of the visual tags; and storing the correspondence between the one genre of the program types and the one of the visual tags and updating the electronic program guide currently displayed on the display.

2. The display apparatus according to claim 1, wherein the at least one processor is further configured to execute the instructions to cause the display apparatus to perform:

obtaining the program type of the first program and a preset corresponding relationship between program types and visual tags;

determining the visual tag corresponding to the program type of the first program according to the preset corresponding relationship between the program types and the visual tags; and displaying the visual tag corresponding to the program type of the first program in the first area for presentation of the first program.

3. The display apparatus according to claim 1, wherein the first setting interface shows an option area for one or more items for the tags of the first type, the option area of the tags of the first type comprises one or more first options, and a first option of the one or more first options is configured for a genre of the first program type; wherein the cancel option is displayed in the option area of the tags of the first type;

wherein the at least one processor is further configured to execute the instructions to cause the display apparatus to perform:

in response to a selection of a target first option from the one or more first options in a target option area, establishing a correspondence between a genre of the first program type corresponding to the target first option and a tag of the first type corresponding to the target option area, and marking a first option other than the target first option in the target option area as unavailable; and in response to a command input based on a target cancel option, establishing a correspondence between the target cancel option and a corresponding tag of the first type.

4. The display apparatus according to claim 1, wherein the second setting interface shows one or more second options, and each second option corresponds to a second program type; and wherein the at least one processor is further configured to execute the instructions to cause the display apparatus to perform:

in response to a selection of a target second option from the user, establishing a correspondence between a second program type corresponding to a non-target second option and the tag of the second type, wherein the non-target second option is a second option in the second setting interface except for the target second option.

5. The display apparatus according to claim 4, wherein the at least one processor is further configured to execute the instructions to cause the display apparatus to perform:

in response to a cancel command from the user on a to-be-canceled second option, establishing a correspondence between the to-be-canceled second option and the tag of the second type, wherein the to-be-canceled second option is a second option that has been selected; and based on that all the second options are not selected, deleting a stored correspondence between the second program type and the tag of the second type, without displaying the tag of the second type in the electronic program guide.

6. The display apparatus according to claim 1, wherein the at least one processor is further configured to execute the instructions to cause the display apparatus to perform:

in response to a selection of a media resource control in a media resource list page from the user, controlling the display to show a playing interface on the user interface in a full screen mode, wherein the playing interface is used for displaying a first multimedia resource corresponding to the media resource control;

in response to a command for displaying the electronic program guide from the user, controlling the display to show a semi-opaque floating layer above the playing interface, and controlling the semi-opaque floating layer to load and present the electronic program guide, wherein a display size of the semi-opaque floating layer is smaller than a display size of the playing interface, and the semi-opaque floating layer allows the first multimedia resource displayed under the semi-opaque floating layer to be viewed by the user;

in response to a command for moving a focus to an item on the floating layer, selecting program information of the item in the electronic program guide;

in response to the selected program information being within a current playing time, obtaining a second multimedia resource corresponding to the program information, and switching the playing interface of the first multimedia resource to a playing interface of the second multimedia resource; and in response to the selected program information being not within the current playing time, generating prompt information for indicating that a current program cannot be played, and controlling the playing interface to continue playing the first multimedia resource.

7. The display apparatus according to claim 6, wherein the floating layer comprises a first display area and a second display area, and the at least one processor is further configured to execute the instructions to cause the display apparatus to perform:

controlling the first display area to present a channel classification list, wherein the channel classification list comprises different types of channels in a classified mode in form of different type controls; and controlling the second display area to present a list of channels and a list of programs, wherein the list of channels comprises a plurality of areas for presentation of the channels in form of different channel controls, wherein each channel is labeled with a channel tag, and channels with a same channel tag belong to a same type in the channel classification list.

8. A method for a display apparatus, comprising:

in response to a command for displaying an electronic program guide from a user via a remote control of the display apparatus, obtaining a set of target channels, a target time period and one or more programs in the set of target channels within the target time period from a server in communication with the display apparatus, wherein the set of target channels comprises all channels presented in a target presentation page, and the target time period is a time period for presentation in the target presentation page; wherein the remote control comprises a plurality of buttons; and controlling a display of the display apparatus to display the electronic program guide comprising the target presentation page on a user interface, wherein the display is configured to display an image from broadcast system or Internet, and/or the user interface; the target presentation page comprises a plurality of areas for channel presentation and a plurality of areas for program presentation, the area for channel presentation is used for presenting a channel name, the area for program presentation is used for presenting one or more program names of the one or more programs, a length of a first area for presentation of a first program is proportional to a program duration of the first program, the first area for presentation of the first program shows a program name of the first program and a visual tag for indicating a program type of the first program;

wherein the program type comprises a first program type for a program which is determined based on content of the program and a second program type for the program which is determined based on function data carried in the content of the program;

the first program type is determined according to genre data in program source signals, and the genre data comprises one or more of: Movie, News, Entertainment, Shows, Music, Sport, Children's, Education, Lifestyle, Drama, Unclassified, Social, or Series;

the function data comprises one or more of Subtitle, Audio Description, or Sign Language;

the visual tag comprises tags of a first type and a tag of a second type;
one of the tags of the first type indicates one genre of the first program type of the program, different tags of the first type indicate different genres of the first program type, and the tags of the first type comprise patterns of the area for program presentation;
the electronic program guide further shows a window for shortcut information, wherein the window for shortcut information locates at one of sides of the target presentation page and shows a mapping list comprising the tags of the first type and names of the first program type corresponding to the tags of first type; and
the tag of the second type indicates the second program type of the program, and the tag of the second type is used for adjusting a display state of the first area for presentation of the first program, and the tag of second type is implemented by: reducing opacity of the first area for presentation of the first program, and/or making the first area for presentation of the first program in unavailable state;
in response to a command for displaying a setting interface from the user, causing the display to show the setting interface that is used for setting a correspondence between program types and visual tags, wherein causing the display to show the setting interface comprises:
in response to a command input by the user via a first button of a control device, causing the display to show a first setting interface, wherein the first setting interface is used for the user to select a first program type added with a tag of the first type, the first setting interface shows cancel options corresponding to the tags of the first type, and each cancel option is used to indicate not to display a corresponding tag of the first type in the electronic program guide; and
in response to a command input by the user via a second button of the control device, causing the display to show a second setting interface, wherein the second setting interface is used to select a second program type not added with the tag of the second type;
in response to a setting command from the user, establishing a correspondence between one genre of the program types and one of the visual tags; and
storing the correspondence between the one genre of the program types and the one of the visual tags and updating the electronic program guide currently displayed on the display.

9. The method according to claim 8, further comprising:
obtaining the program type of the first program and a preset corresponding relationship between program types and visual tags;
determining the visual tag corresponding to the program type of the first program according to the preset corresponding relationship between the program types and the visual tags; and
displaying the visual tag corresponding to the program type of the first program in the first area for presentation of the first program.

10. The method according to claim 8, wherein the first setting interface shows an option area for one or more items for the tags of the first type, the option area of the tags of the first type comprises one or more first options, and a first option of the one or more first options is configured for a genre of the first program type, wherein the cancel option is displayed in the option area of the tags of the first type;
the method further comprising:
in response to a selection of a target first option from the one or more first options in a target option area, establishing a correspondence between a genre of the first program type corresponding to the target first option and a tag of the first type corresponding to the target option area, and marking a first option other than the target first option in the target option area as unavailable; and
in response to a command input based on a target cancel option, establishing a correspondence between the target cancel option and a corresponding tag of the first type.

11. The method according to claim 8, wherein the second setting interface shows one or more second options, and each second option corresponds to a second program type,
the method further comprising:
in response to a selection of a target second option from the user, establishing a correspondence between a second program type corresponding to a non-target second option and the tag of the second type, wherein the non-target second option is a second option in the second setting interface except for the target second option.

12. The method according to claim 8, further comprising:
in response to a selection of a media resource control in a media resource list page from the user, controlling the display to show a playing interface on the user interface in a full screen mode, wherein the playing interface is used for displaying a first multimedia resource corresponding to the media resource control;
in response to a command for displaying the electronic program guide from the user, controlling the display to show a semi-opaque floating layer above the playing interface, and controlling the semi-opaque floating layer to load and present the electronic program guide, wherein a display size of the semi-opaque floating layer is smaller than a display size of the playing interface, and the semi-opaque floating layer allows the first multimedia resource displayed under the semi-opaque floating layer to be viewed by the user;
in response to a command for moving a focus to an item on the floating layer, selecting program information of the item in the electronic program guide;
in response to the selected program information being within a current playing time, obtaining a second multimedia resource corresponding to the program information, and switching the playing interface of the first multimedia resource to a playing interface of the second multimedia resource; and
in response to the selected program information being not within the current playing time, generating prompt information for indicating that a current program cannot be played, and controlling the playing interface to continue playing the first multimedia resource.

13. The method according to claim 12, wherein the floating layer comprises a first display area and a second display area, and the method further comprises:
controlling the first display area to present a channel classification list, wherein the channel classification list comprises different types of channels in a classified mode in form of different type controls; and
controlling the second display area to present a list of channels and a list of programs, wherein the list of channels comprises a plurality of areas for presentation of the channels in form of different channel controls, wherein each channel is labeled with a channel tag, and channels with a same channel tag belong to a same type in the channel classification list.

* * * * *